US010803942B1

United States Patent
Jung et al.

(10) Patent No.: US 10,803,942 B1
(45) Date of Patent: Oct. 13, 2020

(54) TRANSISTOR NOISE TOLERANT, NON-VOLATILE (NV) RESISTANCE ELEMENT-BASED STATIC RANDOM ACCESS MEMORY (SRAM) PHYSICALLY UNCLONABLE FUNCTION (PUF) CIRCUITS, AND RELATED SYSTEMS AND METHODS

(71) Applicants: QUALCOMM Technologies, Incorporated, San Diego, CA (US); Yonsei University, University-Industry Foundation, Seoul (KR)

(72) Inventors: Seong-Ook Jung, Seoul (KR); Byungkyu Song, Seoul (KR); Sehee Lim, Seoul (KR); Seung Hyuk Kang, San Diego, CA (US); Sungryul Kim, San Diego, CA (US)

(73) Assignees: QUALCOMM TECHNOLOGIES, INC., San Diego, CA (US); YONSEI UNIVERSITY, UNIVERSITY—INDUSTRY Foundation, Seoul (KR)

( * ) Notice: Subject to any disclaimer, the term of this patent is extended or adjusted under 35 U.S.C. 154(b) by 0 days.

(21) Appl. No.: 16/434,464

(22) Filed: Jun. 7, 2019

(51) Int. Cl.
*G11C 11/00* (2006.01)
*G11C 14/00* (2006.01)
(Continued)

(52) U.S. Cl.
CPC ........ *G11C 14/0081* (2013.01); *H04L 9/3278* (2013.01); *G11C 11/161* (2013.01);
(Continued)

(58) Field of Classification Search
CPC ....... G11C 11/418; G11C 11/419; G11C 7/24; G11C 8/16; G11C 11/161; G11C 11/1675;
(Continued)

(56) References Cited

U.S. PATENT DOCUMENTS 8,218,349 B2  7/2012 Berger et al.
8,516,269 B1  8/2013 Hamlet et al.
(Continued)

OTHER PUBLICATIONS

Cortez, Mafalda et al., "Modeling SRAM Start-Up Behavior for Physical Unclonable Functions," 2012 IEEE International Symposium on Defect and Fault Tolerance in VLSI and Nanotechnology Systems (DFT), Oct. 3, 2012, 6 pages.
(Continued)

*Primary Examiner* — Thong Q Le
(74) *Attorney, Agent, or Firm* — W&T/Qualcomm

(57) ABSTRACT

Transistor noise tolerant, non-volatile (NV) resistance element-based static random access memory (SRAM) physically unclonable function (PUF) circuits and related systems and methods. In exemplary aspects, a transistor and its complementary transistor, such as a pull-up transistor and complement pull-down transistor or pull-down transistor and complement pull-up transistor, of the PUF circuit are replaced with passive NV resistance elements coupled to the respective output node and complement output node to enhance imbalance between cross-coupled transistors of the PUF circuit for improved PUF output reproducibility. The added passive NV resistance elements replacing pull-up or pull-down transistors in the PUF circuit reduces or eliminates transistor noise that would otherwise occur if the replaced transistors were present in the PUF circuit as a result of changes in temperature, voltage variations, and aging effect. The bit error rate of the PUF circuit is reduced by the reduction in transistor noise thereby improving PUF output reproducibility.

32 Claims, 25 Drawing Sheets

(51) Int. Cl.
*H04L 9/32* (2006.01)
*G11C 11/412* (2006.01)
*G11C 11/16* (2006.01)
*G11C 11/419* (2006.01)

(52) U.S. Cl.
CPC ....... *G11C 11/1659* (2013.01); *G11C 11/1673* (2013.01); *G11C 11/1675* (2013.01); *G11C 11/412* (2013.01); *G11C 11/419* (2013.01)

(58) Field of Classification Search
CPC .............. G11C 11/412; G11C 13/0069; G11C 14/0081; G11C 14/009; G11C 13/00; G11C 13/02; G11C 23/00; G11C 29/02; G11C 11/00; G11C 11/16; G11C 7/00; G11C 7/14; G11C 11/155; G11C 11/18; G11C 11/416; G11C 14/00; G11C 5/06
See application file for complete search history.

(56) References Cited

U.S. PATENT DOCUMENTS

| | | |
|---|---|---|
| 9,202,554 B2 | 12/2015 | Chu et al. |
| 9,489,999 B2 | 11/2016 | Rosenberg et al. |
| 9,495,627 B1 | 11/2016 | Annunziata et al. |
| 9,812,184 B2 | 11/2017 | Kent et al. |
| 9,870,811 B2 | 1/2018 | Wang et al. |
| 10,424,380 B1* | 9/2019 | Li .......................... H04L 9/3278 |
| 2012/0327705 A1 | 12/2012 | Chen et al. |
| 2014/0185361 A1 | 7/2014 | Oh et al. |
| 2015/0069320 A1 | 3/2015 | Rabkin et al. |
| 2015/0071432 A1 | 3/2015 | Zhu et al. |
| 2017/0214532 A1 | 7/2017 | Das et al. |
| 2017/0272258 A1 | 9/2017 | Tanamoto et al. |

OTHER PUBLICATIONS

Holcomb, Daniel E. et al., "Power-up SRAM State as an Identifying Fingerprint and Source of True Random Numbers," IEEE Transactions on Computers, vol. 57, No. 11, Nov. 2008, 14 pages.
Integrated Circuit Engineering Corporation, "SRAM Technology," Section 8, available at least as early as Jun. 6, 2018, 24 pages, smithsonianchips.si.edu/ice/cd/MEMORY97/SEC08.PDF.
Vinella, Paolo, "A study of using STT-MRAM as Memory PUF: Design, Modeling and Quality Evaluation," Thesis, University of Illinois, 2015, 152 pages.
U.S. Appl. No. 16/009,351, filed Jun. 15, 2018.

* cited by examiner

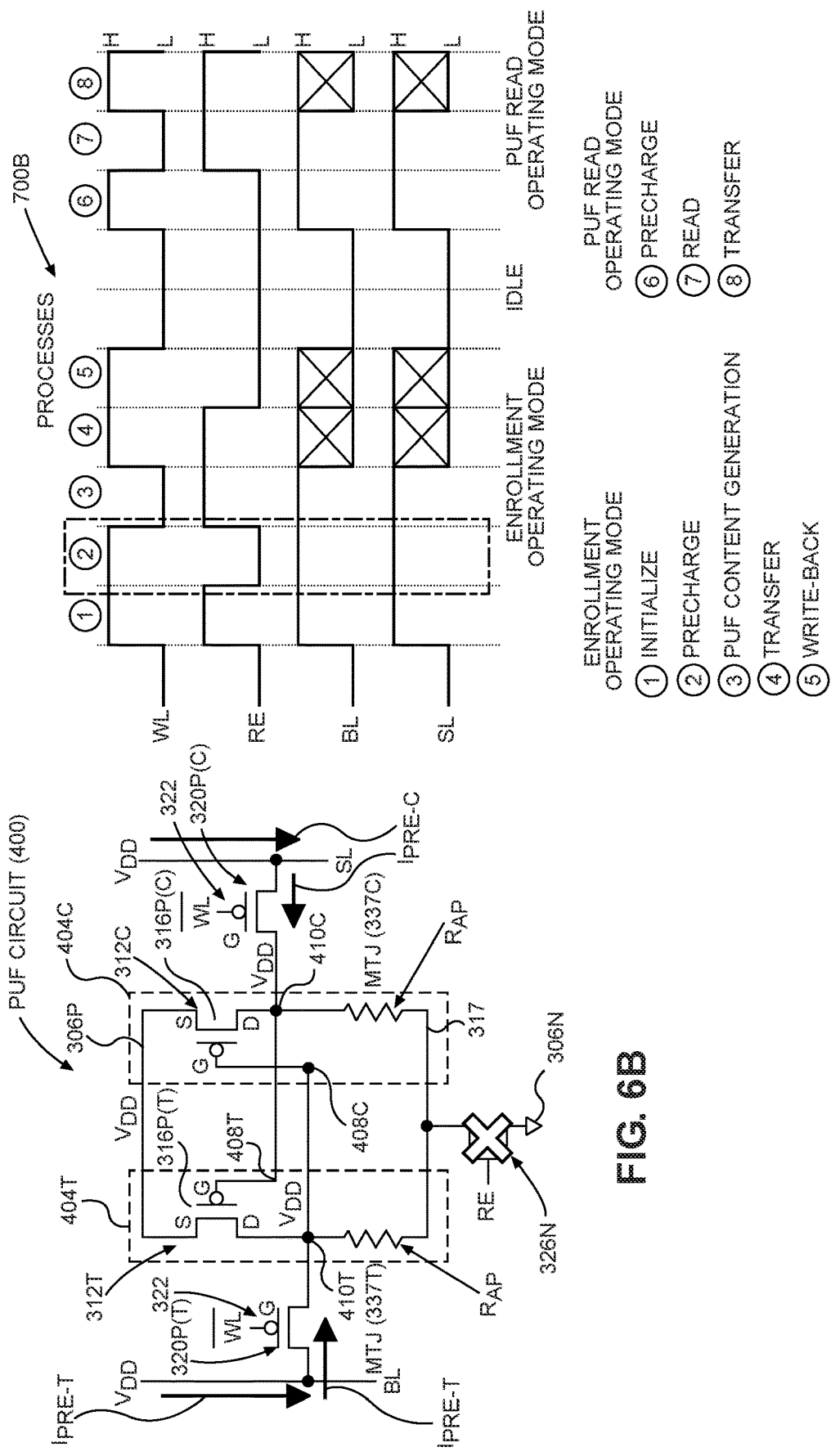

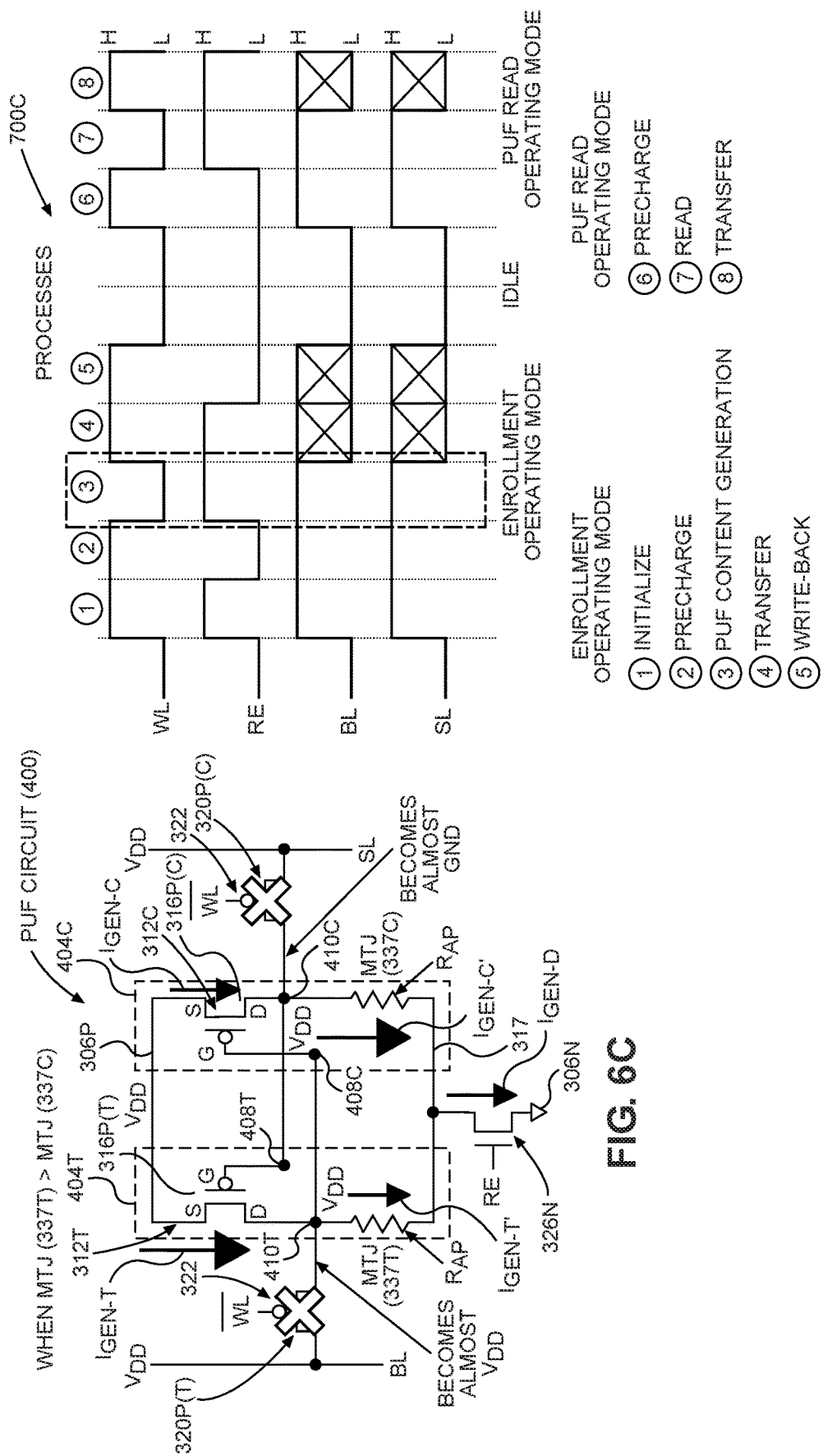

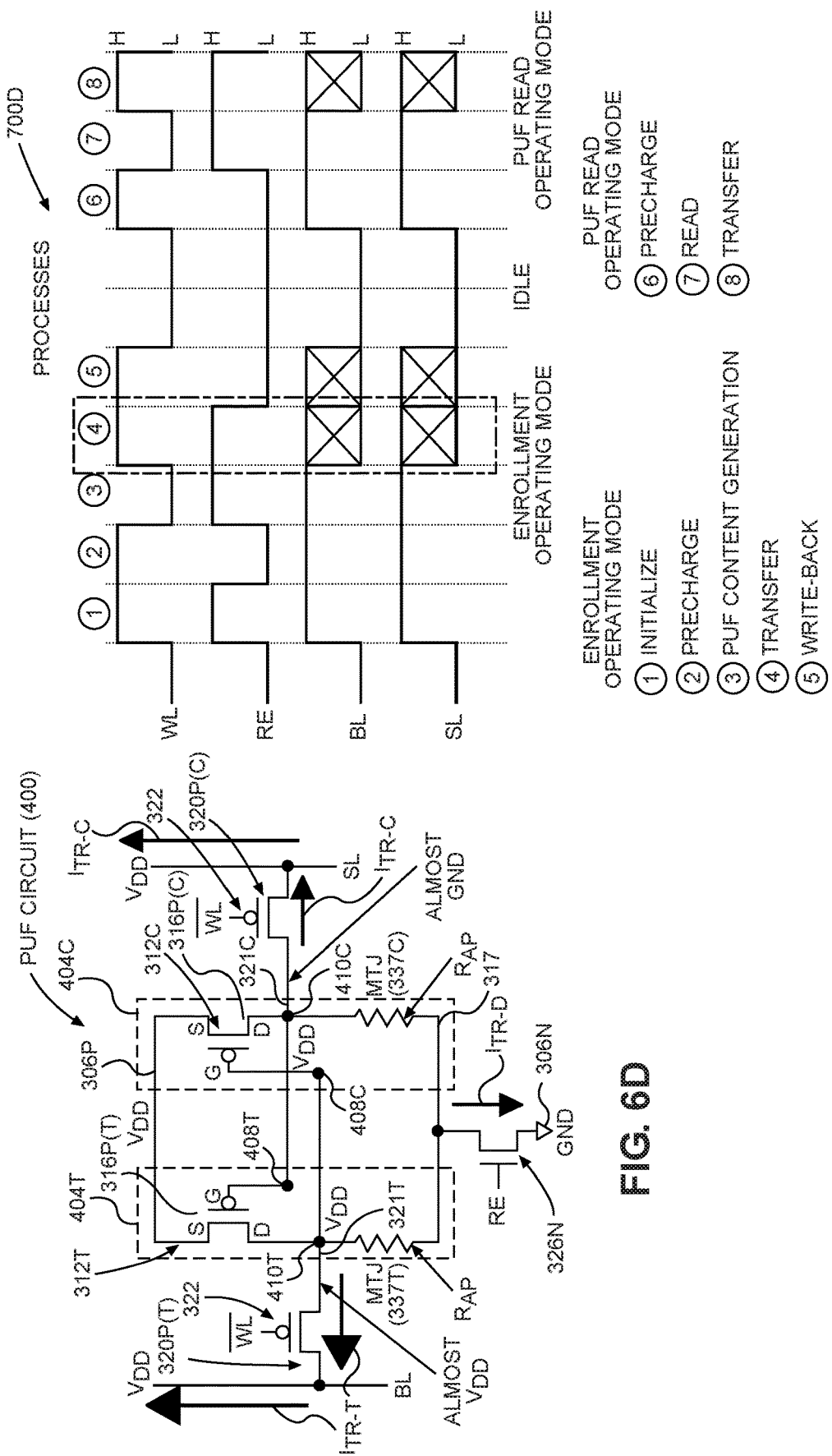

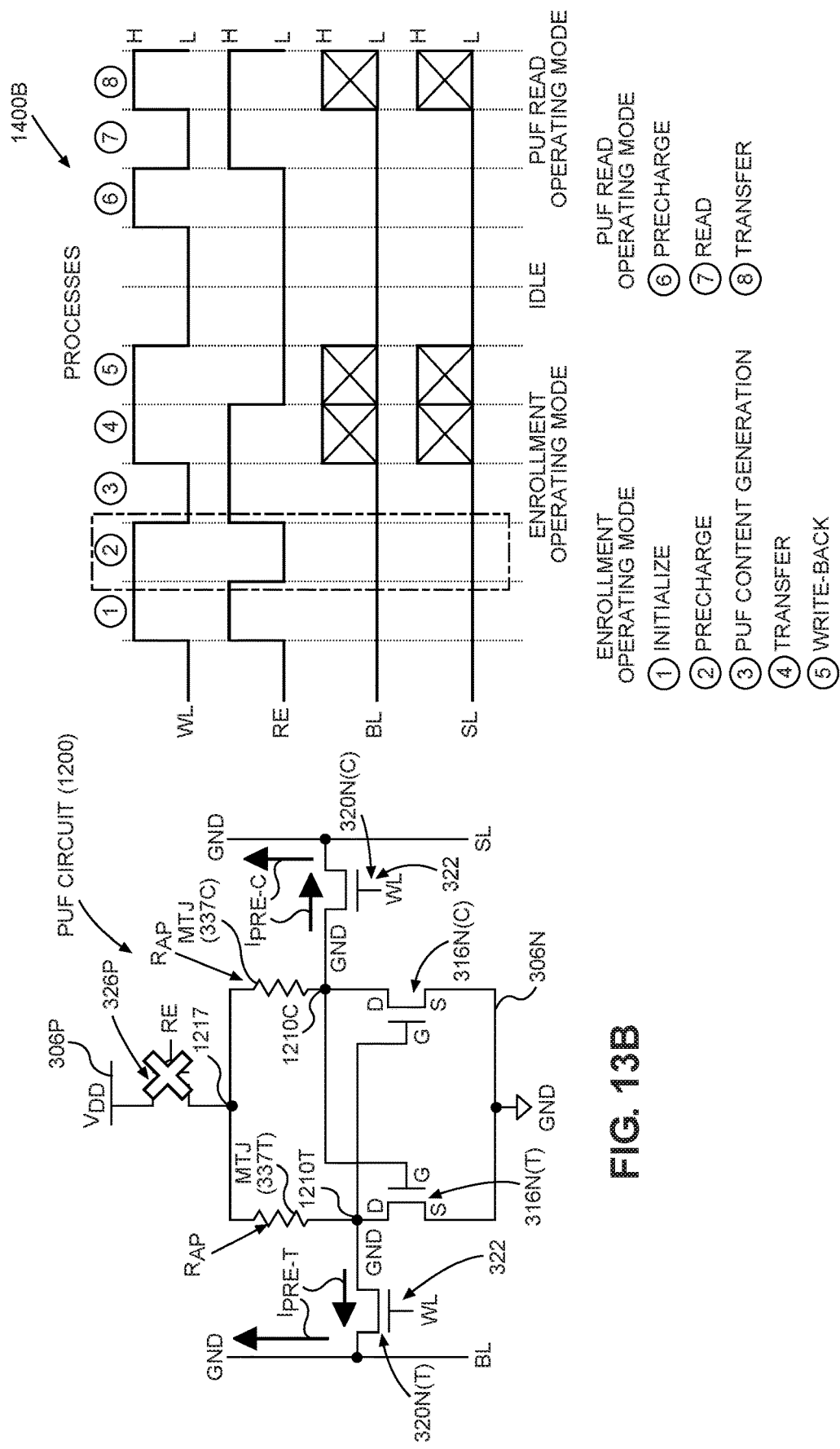

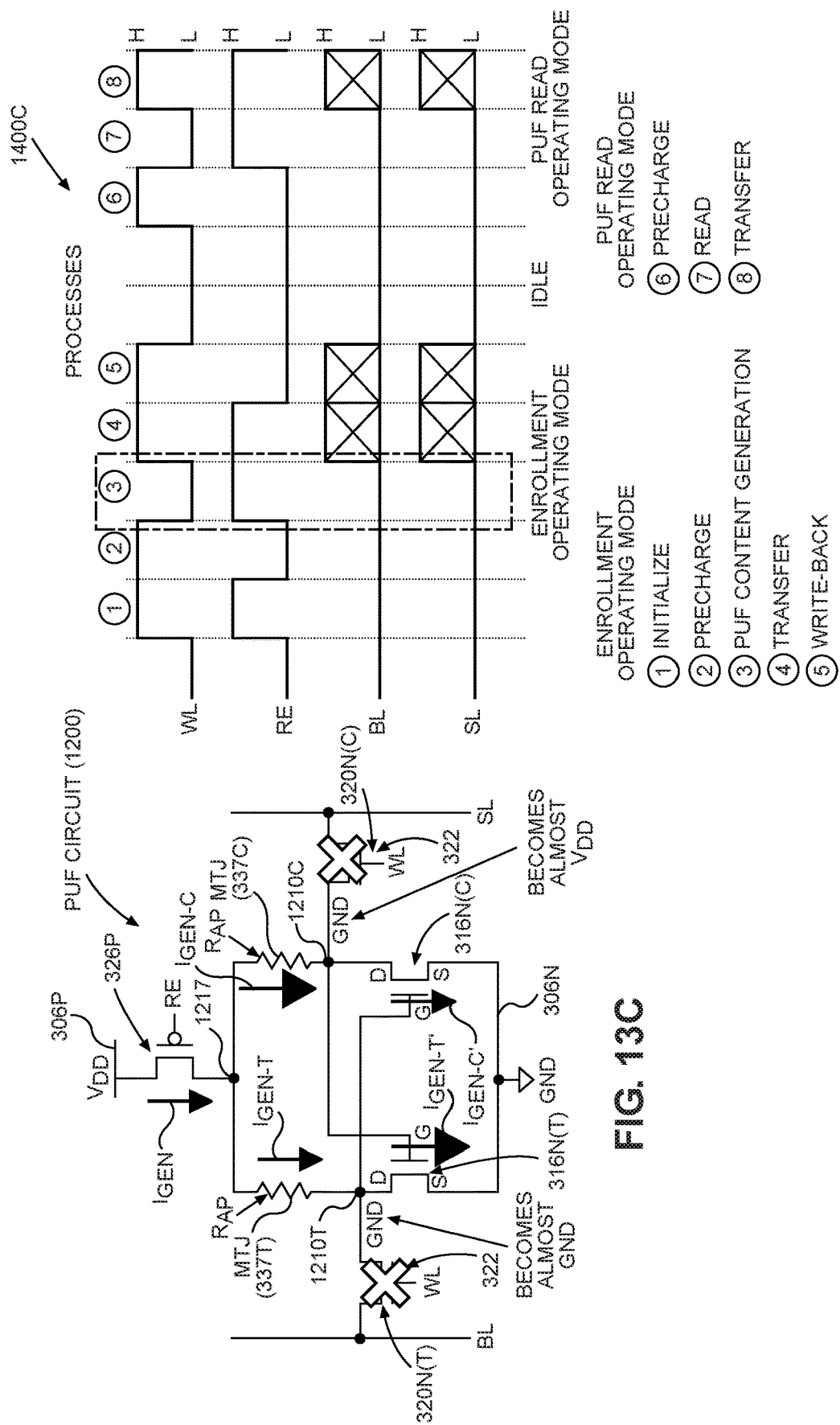

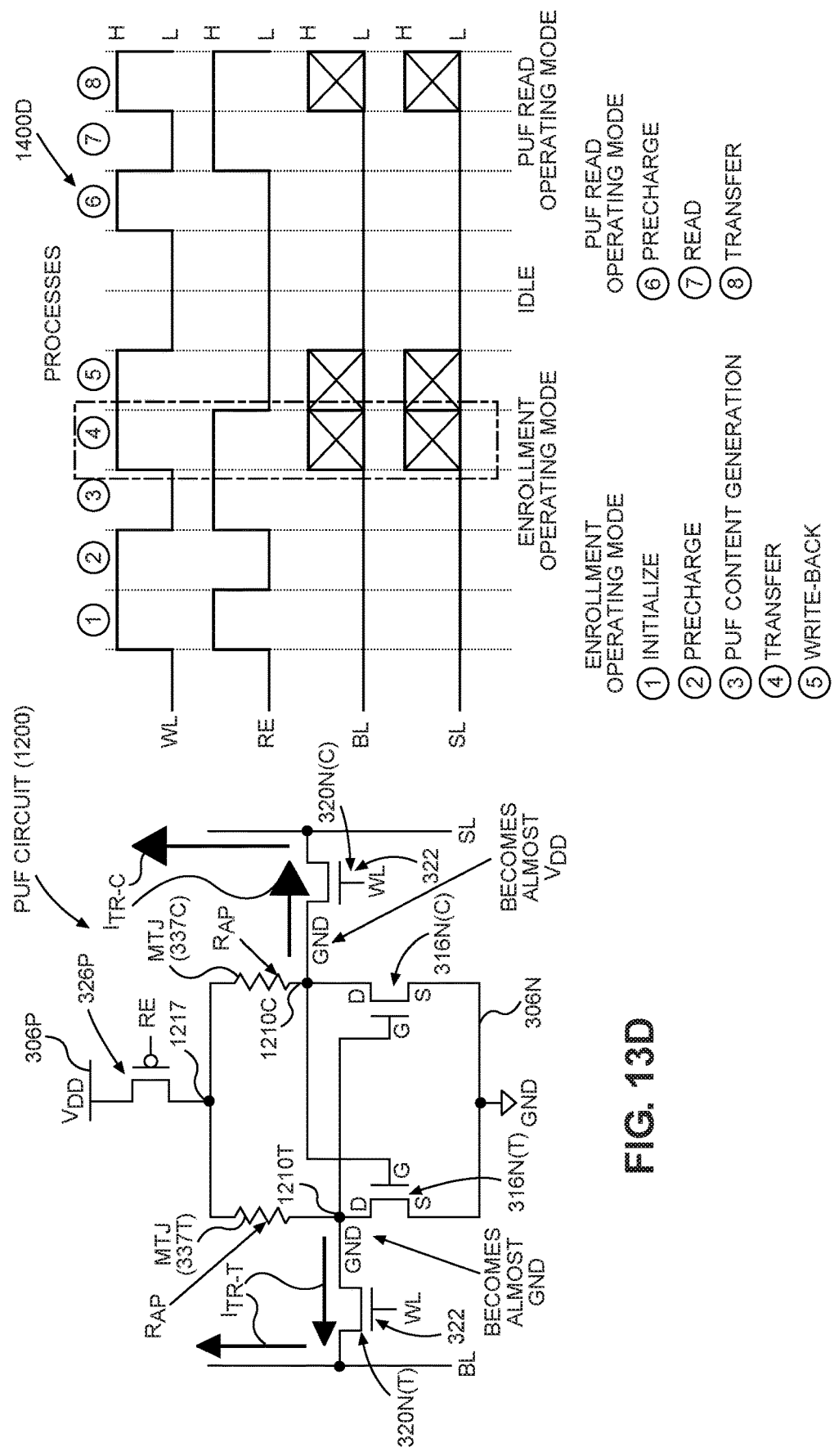

TRANSISTOR NOISE TOLERANT, NON-VOLATILE (NV) RESISTANCE ELEMENT-BASED STATIC RANDOM ACCESS MEMORY (SRAM) PHYSICALLY UNCLONABLE FUNCTION (PUF) CIRCUITS, AND RELATED SYSTEMS AND METHODS

BACKGROUND

I. Field of the Disclosure

The technology of the disclosure relates generally to physically unclonable function (PUF) circuits, and more particularly to a PUF memory employing a static random access memory (SRAM) array of memory bit cells for generating a PUF output in response to a challenge input.

II. Background

A physical unclonable function (PUF) circuit (sometimes also called a physically unclonable function (PUF)) is a physical entity that is embodied in a physical structure, and is easy to evaluate but hard to predict. A specific challenge and its corresponding response together form a challenge-response pair (CRP) or challenge-response behavior. For example, a response generated by the PUF circuit in response to a challenge may be used to authenticate a device or may be used as a cryptographic key. As another example, a mobile device may include circuitry that is configured to generate a response to a challenge for use as a basis for a device identifier of a device. A PUF circuit's "unclonability" means that each integrated circuit (IC) employing the PUF circuit has a unique and unpredictable way of mapping challenges to responses, even if one IC is manufactured with the same process as another seemingly identical IC. PUF circuits depend on the uniqueness of their physical microstructure. Thus, because it is practically infeasible to construct a PUF circuit with the same challenge-response behavior as another PUF circuit, a PUF circuit can be included in an IC to generate unique, random information based on the underlying physical characteristics of a device.

This microstructure depends on random physical factors introduced during manufacturing. For example, in the context of ICs, an on-chip PUF is a chip-unique challenge-response mechanism exploiting manufacturing process variations inside the ICs. For example, as shown in FIG. 1, a challenge 100 is applied to a PUF circuit 102. The reaction of the PUF circuit 102 for a particular device A is called a "response" 104. A specific challenge 100 and its corresponding response 104 together form a challenge-response pair (CRP) 106 or challenge-response behavior of the PUF circuit 102 in device A. The response 104 to the challenge 100 can be provided to and stored by a server 108 for example as part of an initialization/enrollment process. Then, in an authentication process, a challenge 112 can be issued to a PUF circuit 114 for another device B requesting authorization. It is not known if device B is device A. The PUF circuit 114 issues a response 116 to the challenge 112 to the server 108. If the responses 104, 116 match, the server 108 can authenticate device B as device A.

A PUF cell is a PUF circuit that can be provided in the form of a static random access memory (SRAM) cell. For example, FIG. 2 illustrates a PUF cell 200 in the form of an SRAM bit cell 202 that can be provided in a PUF circuit. As shown therein, the SRAM bit cell 202 is comprised of two cross-coupled inverters 204(1), 204(2). Each inverter 204(1), 204(2) includes a pull-up P-type Field-Effect Transistor (FET) (PFET) 206P(1), 206P(2) coupled to a positive voltage rail 208P having a positive supply voltage $V_{DD}$, and a pull-down N-type FET (NFET) 206N(1), 206N(2) coupled to a voltage rail 208N having a ground voltage or negative supply voltage $V_{SS}$. The cross-coupled inverters 204(1), 204(2) reinforce each other to retain data in the form of a voltage on a respective true storage output T and a complement storage output C as PUF outputs. In a read operation, a bit line BL and source line SL are pre-charged to the positive supply voltage $V_{DD}$, or half positive supply voltage $V_{DD/2}$ as examples. Then, a word line WL coupled to gate G of access transistors 210(1), 210(2) is asserted to evaluate the differential voltages on the true storage output T and complement storage output C to read the SRAM bit cell 202. If the SRAM bit cell 202 has not been previously written, the initial state of the SRAM bit cell 202 is determined by process variation of the pull-up PFETs 206P(1), 206P(2) and the pull-down NFETs 206N(1), 206N(2) when the word line WL is asserted to activate the access transistors 210(1), 210(2) (their gate-to-source voltage exceeding their threshold voltage $V_{TH}$). Thus, the SRAM bit cell 202 can be used to generate a random PUF response output. Either the true storage output T or complement storage output C can be used as the random PUF response output. The voltage state ($V_{DD}$ or $V_{SS}$) on the true storage output T will eventually settle to be the opposite voltage state ($V_{SS}$ or $V_{DD}$) on the complement storage output C.

Ideally, the inverters 204(1), 204(2) in the PUF cell 200 will be symmetrically matched so that the SRAM bit cell 202 is not skewed to favor settling to one voltage state over the other on true storage output T and complement storage output C as PUF outputs. For example, length L and threshold voltages $V_{TH}$ of complementary pull-up PFETs 206P(1), 206P(2) and complementary pull-down NFETs 206N(1), 206N(2) can be sized to generate a same voltage noise $V_{NOISE}$ as a function of resistance. However, process variations can cause the complementary pull-up PFETs 206P(1), 206P(2) and complementary pull-down NFETs 206N(1), 206N(2) in the inverters 204(1), 204(2) in the SRAM bit cell 202 to be mismatched, skewing their respective threshold voltages $V_{TH}$, and thus skewing towards one voltage state, potentially eliminating randomness of generating a PUF output. Also, variations in supply voltage applied across the power rails 208P, 208N and as well as temperature variations can vary the threshold voltages of the complementary pull-up PFETs 206P(1), 206P(2) and complementary pull-down NFETs 206N(1), 206N(2) in the inverters 204(1), 204(2).

SUMMARY OF THE DISCLOSURE

Aspects disclosed herein include transistor noise tolerant, non-volatile (NV) resistance element-based static random access memory (SRAM) physically unclonable function (PUF) circuits, and related systems and methods. The PUF circuits are based on an SRAM bit cell structure, and are configured to generate a PUF output in response to a PUF read operation. A conventional SRAM bit cell includes cross-coupled pull-up or pull-down transistors each coupled to an output node and a complement output node. The PUF circuit is a differential circuit configured to generate a PUF output on the output node and complement output node as a function of a voltage applied to a bit line and complement bit line, and the threshold voltage imbalance between the cross-coupled transistors in the PUF circuit. Imbalance between the cross-coupled transistors skews the PUF circuit for PUF output reproducibility at the output node and the complement output node.

In exemplary aspects disclosed herein, a transistor and its complementary transistor, such as the pull-up transistor and the complement pull-down transistor or the pull-down transistor and the complement pull-up transistor, of the PUF circuit are replaced with passive NV resistance elements coupled to the respective output node and complement output node to enhance an imbalance between cross-coupled transistors of the PUF circuit for improved PUF output reproducibility. A passive resistance is provided by a passive component (e.g., a resistor, a magnetic tunnel junction (MTJ), a resistive rRAM resistance, etc.) that does not require electrical power to provide resistance. The resistance element is an NV element meaning its resistance is retained over a power cycle. The added passive NV resistance elements replacing pull-up or pull-down transistors in the PUF circuit reduces or eliminates transistor noise that would otherwise occur if the replaced transistors were present in the PUF circuit as a result of changes in temperature, voltage variations, and aging effect. For example, an MTJ as the added passive NV resistance element maintains a constant resistance for changes in temperature and voltage variations, and does not experience an aging effect like N-type field-effect transistors (FETs) (NFETs) and P-type FETs (PFETs). Thus, the difference in resistances between the added passive NV resistance elements that affects the skew of the PUF circuit is maintained over changes in temperature and voltage variations. This results in reproducibility of the PUF output in a PUF read operation to provide for the PUF circuit to be transistor noise tolerant, thus reducing the bit error rate (BER) of the PUF circuit.

The PUF circuit can support a write-back functionality in a write-back operation if the added passive NV resistance elements are programmable, such as if the added passive NV resistance elements are MTJs, for example. The PUF circuit can be designed so that after a PUF read operation, when the PUF outputs are present on the PUF output node and complement PUF output node, these PUF outputs are used in a write-back mode to cause a write current to flow from one passive resistance element to its complement passive NV resistance element to cause a memory state to be stored (i.e., written) in the programmable passive NV resistance elements. Storing a memory state in the passive NV resistance elements allows controlling of their resistances to reset the PUF circuit for a subsequent read operation. If the complementary transistors that are replaced by the passive NV resistance elements were still present, a current could not flow to both added passive NV resistance elements, because one of the complementary transistors would be turned off. In other aspects, the PUF circuit supports a write-back operation at any time during operation, making it possible to easily reset the PUF circuit. Further, as an example, if the added passive NV resistance elements are MTJs, one MTJ can be reverse connected to its output node from the other complement MTJ coupled to its complement output node so that the same write current can program the MTJs to the opposite memory state (e.g., parallel vs. anti-parallel) to further skew the PUF circuit based on its inherent imbalance, thus causing the PUF circuit to stabilize the PUF outputs faster on subsequent PUF read operations.

In this regard, in one exemplary aspect, a physically unclonable function (PUF) circuit is provided, the PUF circuit comprising a storage circuit. The storage circuit comprises a single field-effect transistor (FET). The storage circuit comprises an input node, an output node, and the single FET coupled to the input node, the output node, and a voltage rail. The PUF circuit also comprises a complement storage circuit comprising a single complement FET, the complement storage circuit comprising a complement input node coupled to the output node of the storage circuit, a complement output node coupled to the input node of the storage circuit, and the single complement FET coupled to the complement input node, the complement output node, and the voltage rail. The PUF circuit also comprises a passive non-volatile (NV) resistance element having a resistance, the passive NV resistance element coupled directly to the single FET, and a complement passive NV resistance element having a complement resistance, the complement passive NV resistance element coupled directly to the single complement FET.

In another exemplary aspect, a method of generating a physically unclonable function (PUF) response output from a PUF circuit is provided, the method comprising charging a bit line with a voltage based on a voltage on a voltage rail and charging a source line with the voltage based on the voltage on the voltage rail. In response to a word line signal indicating an access-enable state, the method comprises coupling the bit line to an output node of a storage circuit of a PUF circuit, the PUF circuit comprising the storage circuit, further comprising a single field-effect transistor (FET). The storage circuit comprises an input node, the output node, and the single FET coupled to the input node, the output node, and the voltage rail. The method further comprises a complement storage circuit comprising a single complement FET, the complement storage circuit comprising a complement input node coupled to the output node of the storage circuit, a complement output node coupled to the input node of the storage circuit, and the single complement FET coupled to the complement input node, the complement output node, and the voltage rail. The method further comprises a passive non-volatile (NV) resistance element having a resistance, the passive NV resistance element coupled directly to the single FET, and a complement passive NV resistance element having a complement resistance, the complement passive NV resistance element coupled directly to the single complement FET, and coupling the source line to the complement output node of the complement storage circuit. In response to the word line signal indicating an access-disable state, the method comprises decoupling the bit line from the input node of the storage circuit, decoupling the source line from the complement input node of the complement storage circuit, generating a PUF output data indicating a memory state of the storage circuit and the complement storage circuit on the output node, and generating a complement PUF output data on a complement output node indicating a complement memory state complementary to the memory state.

In another exemplary aspect, a physically unclonable function (PUF) memory system is provided. The system comprises a PUF memory array comprising a plurality of memory bit cell row circuits each comprising a plurality of PUF circuits. Each of the plurality of the PUF circuits comprises a storage circuit comprising a single field-effect transistor (FET). The storage circuit comprises an input node, an output node, and the single FET coupled to the input node, the output node, and a voltage rail. Each of the plurality of the PUF circuits further comprises a complement storage circuit comprising a single complement FET, the complement storage circuit comprising a complement input node coupled to the output node of the storage circuit, a complement output node coupled to the input node of the storage circuit, and the single complement FET coupled to the complement input node, the complement output node, and the voltage rail. Each of the plurality of the PUF circuits further comprises a passive non-volatile (NV) resistance element having a resistance, the passive NV resistance element coupled directly to the single FET, and a complement passive NV resistance element having a complement resistance, the complement passive NV resistance element coupled directly to the single complement FET. The PUF memory array further comprises a plurality of PUF bit cell column circuits each comprising a PUF circuit among the plurality of PUF circuits from a memory bit cell row circuit among the plurality of memory bit cell row circuits. The PUF memory system further comprises a PUF output coupled to the PUF memory array, the PUF memory array configured to generate a data output on the PUF output based on a memory state in at least one PUF circuit among the plurality of PUF circuits accessed in a PUF read operation to the PUF memory array.

BRIEF DESCRIPTION OF THE FIGURES

FIGS. 6A-6E are diagrams illustrating current flows for exemplary enrollment processes for exemplary enrollment operating modes of the PUF circuit in FIG. 4;

FIGS. 7A-7E are signal diagrams illustrating exemplary signal levels of signals asserted to the PUF circuit in FIG. 4 to control the enrollment processes for the enrollment operating modes illustrated in FIGS. 6A-6E, respectively;

FIGS. 13A-13E are diagrams illustrating current flows for exemplary enrollment processes for an exemplary enrollment operating mode of the PUF circuit in FIG. 12;

FIGS. 14A-14E are signal diagrams illustrating exemplary signal levels of signals asserted to the PUF circuit in FIG. 12 to control the enrollment processes for the enrollment operating modes illustrated in FIGS. 13A-13E, respectively;

DETAILED DESCRIPTION

Figure 1:
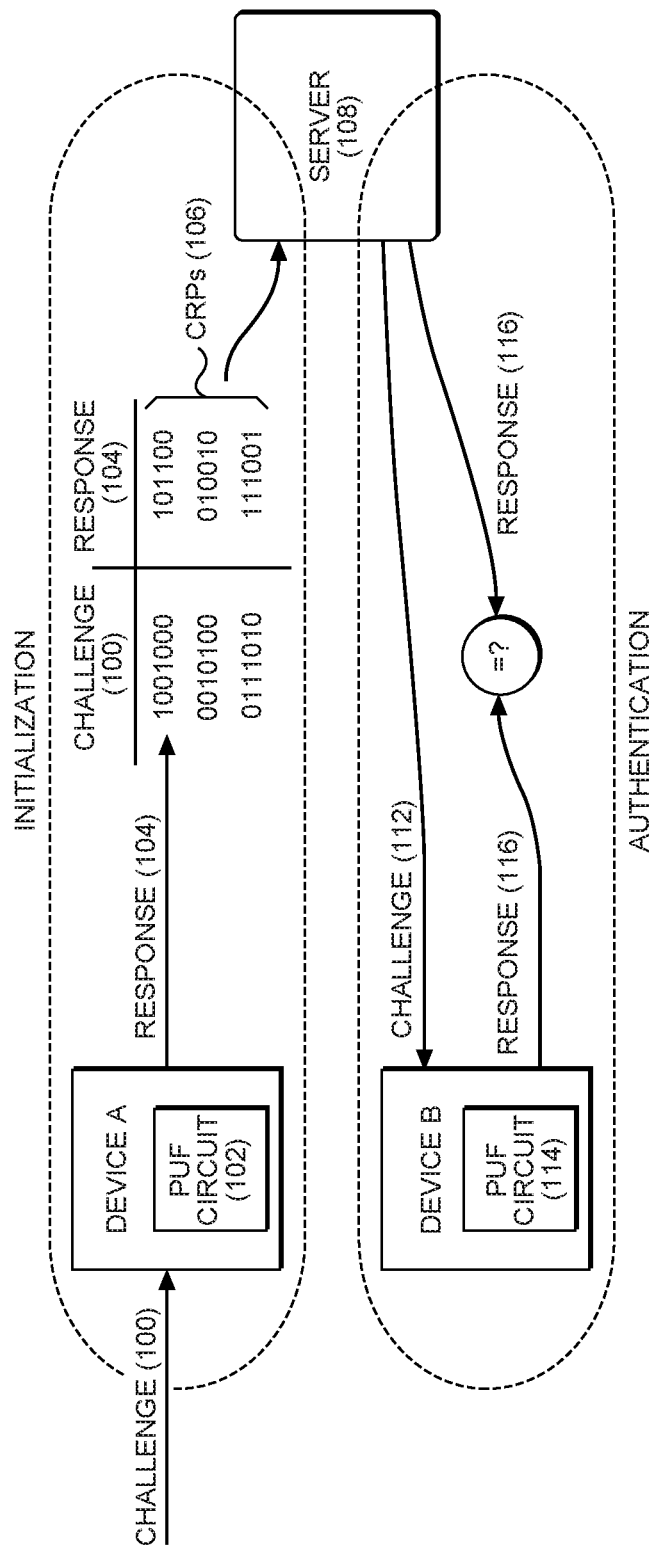
FIG. 1 is a diagram of an exemplary initialization and authentication process of a first device registering one or more challenge-response pairs (CRPs) with a server, and a second device requesting to be authenticated by the server based on a response to an issued challenge.
Figure 2:
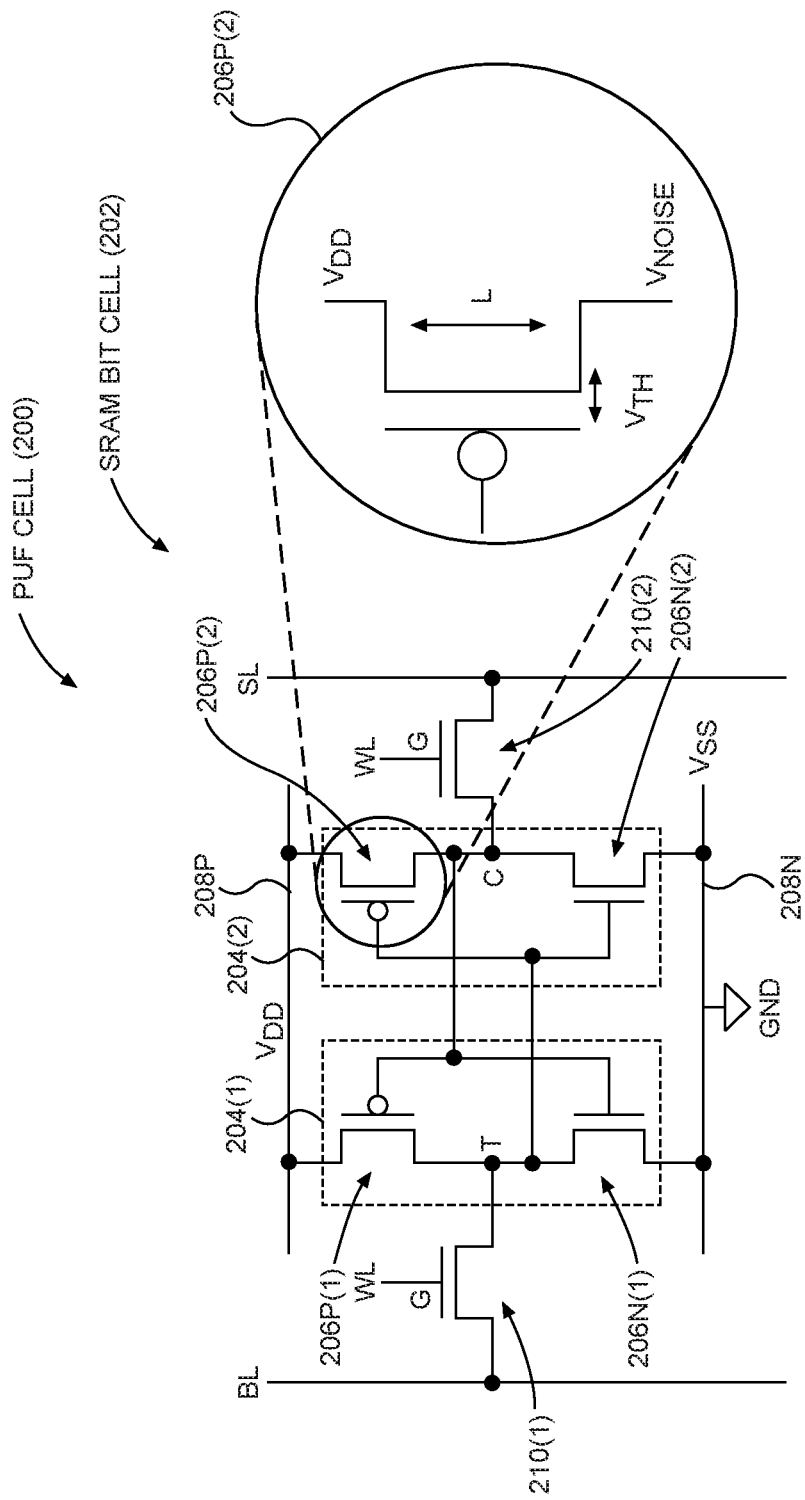
FIG. 2 is a schematic diagram of an exemplary static random access memory (SRAM) bit cell that can be used as a PUF cell in a PUF circuit.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include transistor noise tolerant, non-volatile (NV) resistance element-based static random access memory (SRAM) physically unclonable function (PUF) circuits, and related systems and methods. The PUF circuits are based on an SRAM bit cell structure, and are configured to generate a PUF output in response to a PUF read operation. A conventional SRAM bit cell includes cross-coupled pull-up or pull-down transistors each coupled to an output node and a complement output node. The PUF circuit is a differential circuit configured to generate a PUF output on the output node and complement output node as a function of a voltage applied to a bit line and complement bit line, and the threshold voltage imbalance between the cross-coupled transistors in the PUF circuit. Imbalance between the cross-coupled transistors skews the PUF circuit for PUF output reproducibility at the output node and the complement output node.

In exemplary aspects disclosed herein, a transistor and its complementary transistor, such as the pull-up transistor and the complement pull-down transistor or the pull-down transistor and the complement pull-up transistor, of the PUF circuit are replaced with passive NV resistance elements coupled to the respective output node and complement output node to enhance an imbalance between cross-coupled transistors of the PUF circuit for improved PUF output reproducibility. A passive resistance is provided by a passive component (e.g., a resistor, a magnetic tunnel junction (MTJ), a resistive rRAM resistance, etc.) that does not require electrical power to provide resistance. The resistance element is an NV element meaning its resistance is retained over a power cycle. The added passive NV resistance elements replacing pull-up or pull-down transistors in the PUF circuit reduces or eliminates transistor noise that would otherwise occur if the replaced transistors were present in the PUF circuit as a result of changes in temperature, voltage variations, and aging effect. For example, an MTJ as the added passive NV resistance element maintains a constant resistance for changes in temperature and voltage variations, and does not experience an aging effect like N-type field-effect transistors (FETs) (NFETs) and P-type FETs (PFETs). Thus, the difference in resistances between the added passive NV resistance elements that affects the skew of the PUF circuit is maintained over changes in temperature and voltage variations. This results in reproducibility of the PUF output in a PUF read operation to provide for the PUF circuit to be transistor noise tolerant, thus reducing the bit error rate (BER) of the PUF circuit.

Before discussing transistor noise tolerant, SRAM-based PUF circuits starting at FIG. 4, an SRAM circuit that can be used in a PUF application to generate a PUF output data and that is not transistor noise tolerant is discussed below with regard to FIGS. 3A and 3B.

Figure 3A:
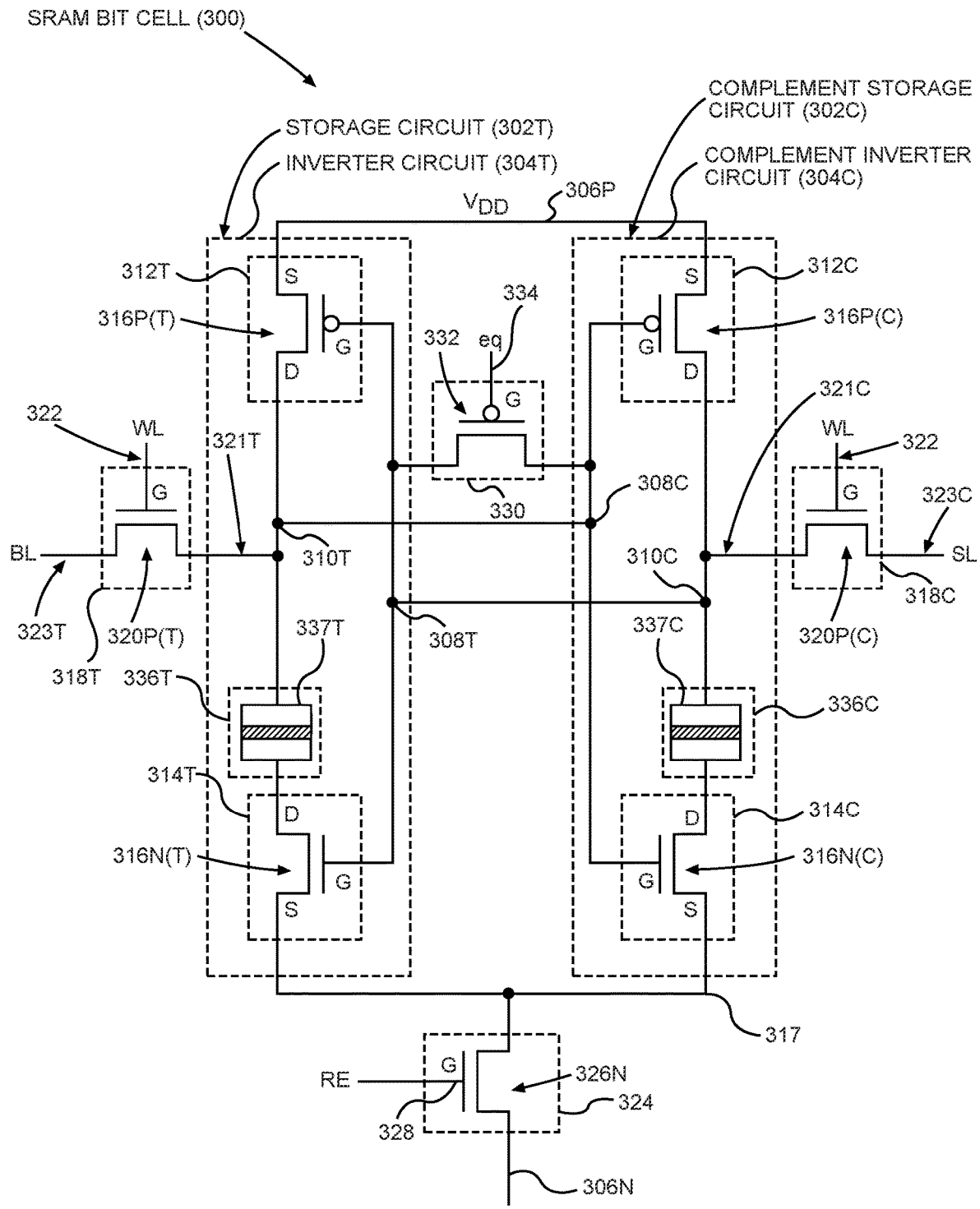
FIG. 3A is a schematic diagram of an exemplary PUF circuit in the form of an SRAM bit cell with passive non-volatile (NV) resistance elements in the form of magnetic tunnel junctions (MTJs) added and coupled to respective complementary PUF output nodes and drains of respective complementary pull-up P-type field effect transistors (FETs) (PFETs) and complementary pull-down N-type FETs (NFETs) of cross-coupled inverter circuits, to enhance imbalance between transistors in the inverter circuits.

FIG. 3A illustrates an exemplary SRAM bit cell 300 that is a 6-transistor (T) (6-T) static complement memory bit cell. The SRAM bit cell 300 includes a storage circuit 302T and a complement storage circuit 302C that include respective cross-coupled inverter and complement inverter circuits 304T, 304C powered by a positive supply voltage $V_{DD}$ on a positive voltage rail 306P. The inverter and complement inverter circuits 304T, 304C include respective input and complement input nodes 308T, 308C, and respective output and complement output nodes 310T, 310C. The inverter and complement inverter circuits 304T, 304C are each configured to generate respective PUF output data and complement PUF output data 321T, 321C representing data on its respective output and complement output nodes 310T, 310C that is an inverted logic state of a signal representing data on its respective complement input node 308C and input node 308T. The inverter and complement inverter circuits 304T, 304C reinforce each other to retain data in the form of a voltage on a respective output node 310T and a complement output node 310C by their respective output and complement output nodes 310T, 310C being coupled to the respective complement input node 308C and input node 308T.

The inverter and complement inverter circuits 304T, 304C in the SRAM bit cell 300 are each comprised of a respective pull-up circuit 312T and complement pull-up circuit 312C coupled to a respective pull-down circuit 314T and complement pull-down circuit 314C. In this example, the pull-up and complement pull-up circuits 312T, 312C are respective pull-up and complement pull-up PFETs 316P(T), 316P(C). The pull-down and complement pull-down circuits 314T, 314C are respective pull-down and complement pull-down NFETs 316N(T), 316N(C). The pull-up PFET 316P(T) and complement pull-up PFET 316P(C) are both coupled to the positive voltage rail 306P configured to receive the positive supply voltage $V_{DD}$. An access circuit 318T and complement access circuit 318C are coupled to the respective inverter and complement inverter circuits 304T, 304C to provide read and write access to the SRAM bit cell 300. In this example, the access circuit 318T and complement access circuit 318C are transistors in the form of a respective access PFET 320P(T) and complement access PFET 320P(C). The access and complement access PFETs 320P(T), 320P(C) are coupled to a respective bit line BL and source line SL.

With continuing reference to FIG. 3A, in a read operation to the SRAM bit cell 300, the bit line BL and source line SL are pre-charged to a same voltage, which in this example is a voltage based on the positive supply voltage $V_{DD}$. Then, a word line signal 322 of an access-enable state (e.g., a higher voltage value) is asserted on a word line WL coupled to gates G of the access and complement access PFETs 320P(T), 320P(C) to evaluate the differential voltages on the output node 310T and complement output node 310C to read the SRAM bit cell 300. Activation of the access and complement access PFETs 320P(T), 320P(C) will couple the respective bit line BL and source line SL to the output node 310T and complement output node 310C. Deactivation of the access and complement access PFETs 320P(T), 320P(C) will decouple the respective bit line BL and source line SL from the output node 310T and complement output node 310C. If a logic high voltage level (i.e., a '1') is stored at the output node 310T, a logic low voltage level (i.e., '0') is stored at the complement output node 310C. If a logic low voltage level (i.e., a '0') is stored at the output node 310T, a logic high voltage level (i.e., '1') is stored at the complement output node 310C. Activation of the word line WL will cause the access and complement access PFETs 320P(T), 320P(C) to discharge the voltages on the output node 310T and complement output node 310C to the respective bit line BL and source line SL as PUF output data 321T and complement PUF output data 321C (that has a complementary logic state to PUF output data 321T) of the SRAM bit cell 300.

With continuing reference to FIG. 3A, in a write operation to the SRAM bit cell 300, the bit line BL and source line SL are charged with PUF write data 323T and complement PUF write data 323C (that has a complementary logic state to PUF write data 323T) to be written to the output or complement output nodes 310T, 310C. The write data charged on the bit line BL and source line SL has complementary logic values, unlike when a read operation is performed. Then, a word line signal 322 of an access-enable state (e.g., a higher voltage value) is asserted on a word line WL coupled to gates G of the access and complement access PFETs 320P(T), 320P(C). If a logic high voltage level (i.e., a '1') is stored at the output node 310T, a logic low voltage level (i.e., '0') is stored at the complement output node 310C. If a logic low voltage level (i.e., a '0') is stored at the output node 310T, a logic high voltage level (i.e., '1') is stored at the complement output node 310C. Activation of the word line WL will cause the write data on the bit line BL and source line SL to pass through the access and complement access PFETs 320P(T), 320P(C) to the output or complement output nodes 310T, 310C as PUF write data.

With continuing reference to FIG. 3A, the SRAM bit cell 300 also includes a read-enable control circuit 324 in the form of an NFET 326N ("read-enable NFET 326N") in this example. The read-enable NFET 326N is coupled between source S of the pull-down and complement pull-down NFETs 316N(T), 316N(C) and a read-enable node 317 to control when the SRAM bit cell 300 is activated. The pull-down NFET 316N(T) and complement pull-down NFET 316N(C) are coupled to the read-enable node 317, which is coupled to a voltage rail 306N which may be a ground node or coupled to negative supply voltage for example. The pull-down NFET 316N(T) and complement pull-down NFET 316N(C) are coupled to a read-enable node 317 which is coupled to the voltage rail 306N when the read-enable control circuit 324 is activated (i.e., turned on). A gate G of the read-enable NFET 326N is configured to receive a read-enable signal RE on a read-enable control input 328. Also as shown in FIG. 3A, the SRAM bit cell 300 further includes an equalization circuit 330, which is a PFET 332 in this example. The equalization circuit 330 includes an equalization input 334, which is coupled to a gate G of the PFET 332. The equalization circuit 330 is configured to couple the input node 308T to the complement input node 308C in response to an equalization enable signal eq on the equalization input 334 indicating an equalization enable state, and decouple the input node 308T from the complement input node 308C in response to the equalization enable signal eq on the equalization input 334 indicating an equalization disable state. The equalization circuit 330 can be activated to couple the input node 308T to the complement input node 308C in response to a PUF read operation so that the respective complement output node 310C and output node 310T are forced to start at the same data value before a read operation occurs. The natural logic state skew of the SRAM bit cell 300 will control the ultimate data values on the output node 310T and complement output node 310C.

With continuing reference to FIG. 3A, the imbalance of the inverter and complement inverter circuits 304T, 304C in the SRAM bit cell 300 is a function of the resistance mismatch between the same type, complement transistors in the inverter and complement inverter circuits 304T, 304C. Ideally, the inverter and complement inverter circuits 304T, 304C in the SRAM bit cell 300 will be symmetrically matched so that the SRAM bit cell 300 is not skewed to favor settling to one voltage state over the other. However, process variations can cause the pull-up and complement pull-up PFETs 316P(T), 316P(C) and pull-down and complement pull-down NFETs 316N(T), 316N(C) in the inverter and complement inverter circuits 304T, 304C in the SRAM bit cell 300 to be mismatched, and thus be skewed towards one voltage state. Thus, the SRAM bit cell 300 can be used to provide memory cells in a PUF circuit to generate a random PUF output response to take advantage of this imbalance in the inverter and complement inverter circuits 304T, 304C that will occur through process variation. However, the imbalance may not be large enough such that that reproducibility of the SRAM bit cell 300 is consistent. Further, variations can also occur in supply voltage and temperature during operation that can change the imbalance between inverter and complement inverter circuits 304T, 304C such that the PUF output response of the SRAM bit cell 300 is not reproducible.

To enhance the imbalance between the inverter and complement inverter circuits 304T, 304C in the SRAM bit cell 300 in FIG. 3A, passive and complement passive NV resistance elements 336T, 336C are added. In this example, the passive and complement passive NV resistance elements 336T, 336C are added in the form of MTJs 337T, 337C each having a respective resistance, as shown in FIG. 3A. In this example, the passive NV resistance element 336T is coupled to the pull-up circuit 312T and the pull-down circuit 314T. The complement passive NV resistance element 336C is coupled to the complement pull-up circuit 312C and the complement pull-down circuit 314C. More specifically, in this example, the passive NV resistance element 336T is coupled between the drain D of the pull-down NFET 316N(T) and the output node 310T of the inverter circuit 304T, wherein the output node 310T is also coupled to the drain D of the pull-up PFET 316P(T). Similarly, in this example, the complement passive NV resistance element 336C is coupled between the drain D of the complement pull-down NFET 316N(C) and the complement output node 310C of the complement inverter circuit 304C, wherein the complement output node 310C is also coupled to the drain D of the complement pull-up PFET 316P(C). The resistances of the MTJs 337T, 337C can be programmed to adjust the resistance of the passive NV resistance and complement passive NV resistance elements 336T, 336C to change or further enhance the imbalance of the SRAM bit cell 300.

Figure 3B:
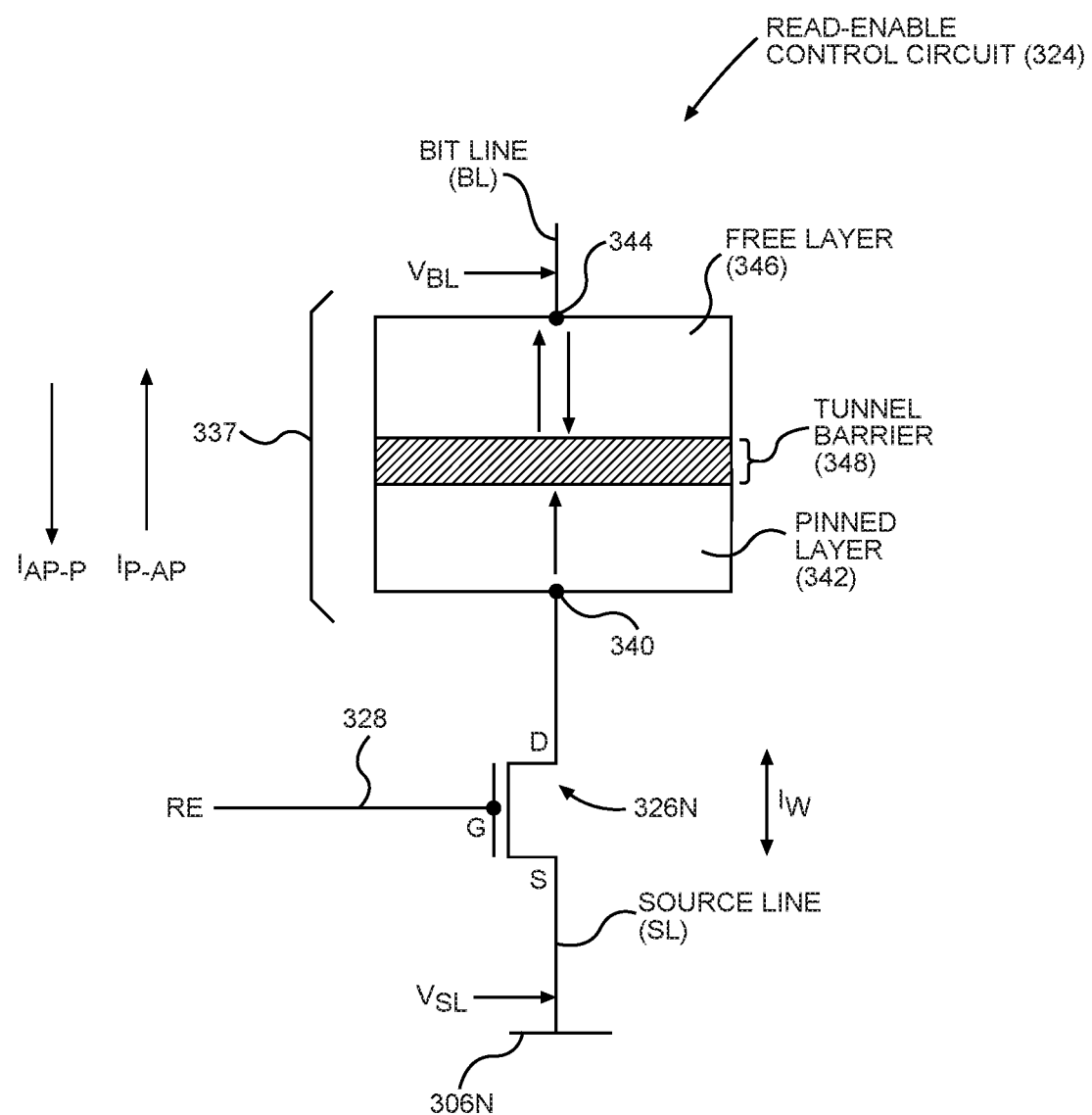
FIG. 3B is a schematic diagram of a pull-down NFET in the PUF circuit in FIG. 3A coupled to an MTJ to illustrate write operations to the MTJ to program its resistance to a desired resistance state.

FIG. 3B illustrates a more detailed, exemplary diagram of an MTJ that can be MTJ 337T or 337C in the SRAM bit cell 300 in FIG. 3A to discuss how the resistances of such MTJs 337T, 337C can be programmed. In this example, the MTJ in FIG. 3B is a spin-transfer torque (STT) (STT-MTJ) device wherein the spin polarization of carrier electrons, rather than a pulse of a magnetic field, is used to program the state stored in the MTJ device (i.e., a '0' or a '1'). The read-enable control circuit 324 in FIG. 3B controls reading and writing to the MTJ. A drain D of the read-enable control circuit 324 is coupled to a first, bottom electrode 340 of the MTJ, which is coupled to a pinned layer 342 having a fixed or pinned magnetization direction. A read-enable signal RE on the read-enable control input 328 is coupled to a gate G of the read-enable control circuit 324. A source S of the read-enable control circuit 324 is coupled to the voltage rail 306N in FIG. 3B (which may be a ground node) through a source line SL. A bit line BL is coupled to a second, top electrode 344 of the MTJ, which is coupled to a free layer 346 having a free magnetization allowing its magnetic moment to be changed in direction. The pinned layer 342 and the free layer 346 are separated by a tunnel barrier 348.

With continuing reference to FIG. 3B, the resistance of the MTJ can be programmed by a write operation. The gate G of the read-enable control circuit 324 is activated by activating the read-enable signal RE. A write voltage differential between a voltage $V_{BL}$ on the bit line BL and the voltage $V_{SL}$ on the source line SL is applied to generate a write signal $I_W$ between the drain D and the source S of the read-enable control circuit 324 sufficient to change the magnetic orientation of the MTJ. If the magnetic orientation (i.e., direction) of the MTJ is to be changed from antiparallel (AP) to parallel (P), a write current $I_{AP-P}$ flowing from the free layer 346 to the pinned layer 342 is generated. This induces an STT at the free layer 346 to change the magnetic orientation of the free layer 346 to P with respect to the pinned layer 342. If the magnetic orientation is to be changed from P to AP, a current $I_{P-AP}$ flowing from the pinned layer 342 to the free layer 346 is produced, which induces an STT at the free layer 346 to change the magnetic orientation of the free layer 346 to AP with respect to the pinned layer 342. The resistance of the MTJ is based on the magnetic orientation of the free layer 346. If the magnetic orientations of the MTJ's free layer 346 and pinned layer 342 are oriented in a P magnetization to each other, the MTJ presents a lower resistance than the resistance the MTJ would present if the magnetic orientations of the free layer 346 and the pinned layer 342 were in an AP magnetic orientation to each other. The two different resistances represent a logic '0' and a logic '1' stored in the MTJ that can be used to provide the added passive NV resistance in the SRAM bit cell 300 in FIG. 3A.

The transistor lengths L and threshold voltages of the pull-up and complement pull-up PFETs 316P(T), 316P(C) in the SRAM bit cell 300 in FIG. 3A can be sized to each other to generate approximately the same voltage noise as a function of resistance. The transistor lengths L and threshold voltages of the pull-down and complement pull-down NFETs 316N(T), 316N(C) in the SRAM bit cell 300 in FIG. 3A can also be sized relative to each other generate approximately the same voltage noise as a function of resistance. However, variations can occur in operating voltage applied across the voltage rails 306P, 306N and temperature in the SRAM bit cell 300. Although the resistance of the MTJs 337T, 337C remain constant of such operational variations, these variations can vary the threshold voltages of the pull-up and complement pull-up PFETs 316P(T), 316P(C) and pull-down and complement pull-down NFETs 316N(T), 316N(C) in the SRAM bit cell 300. Also, an aging effect can occur in the pull-up and complement pull-up PFETs 316P(T), 316P(C) and pull-down and complement pull-down NFETs 316N(T), 316N(C) in the SRAM bit cell 300, changing their threshold voltages over time. These variations in threshold voltages between the pull-up and complement pull-up PFETs 316P(T), 316P(C) and between the pull-down and complement pull-down NFETs 316N(T), 316N(C) can cause the SRAM bit cell 300 to generate PUF output data 321T (and complement PUF output data 321C) inconsistently between different read operations, which may not be desired for PUF applications.

Figure 4:
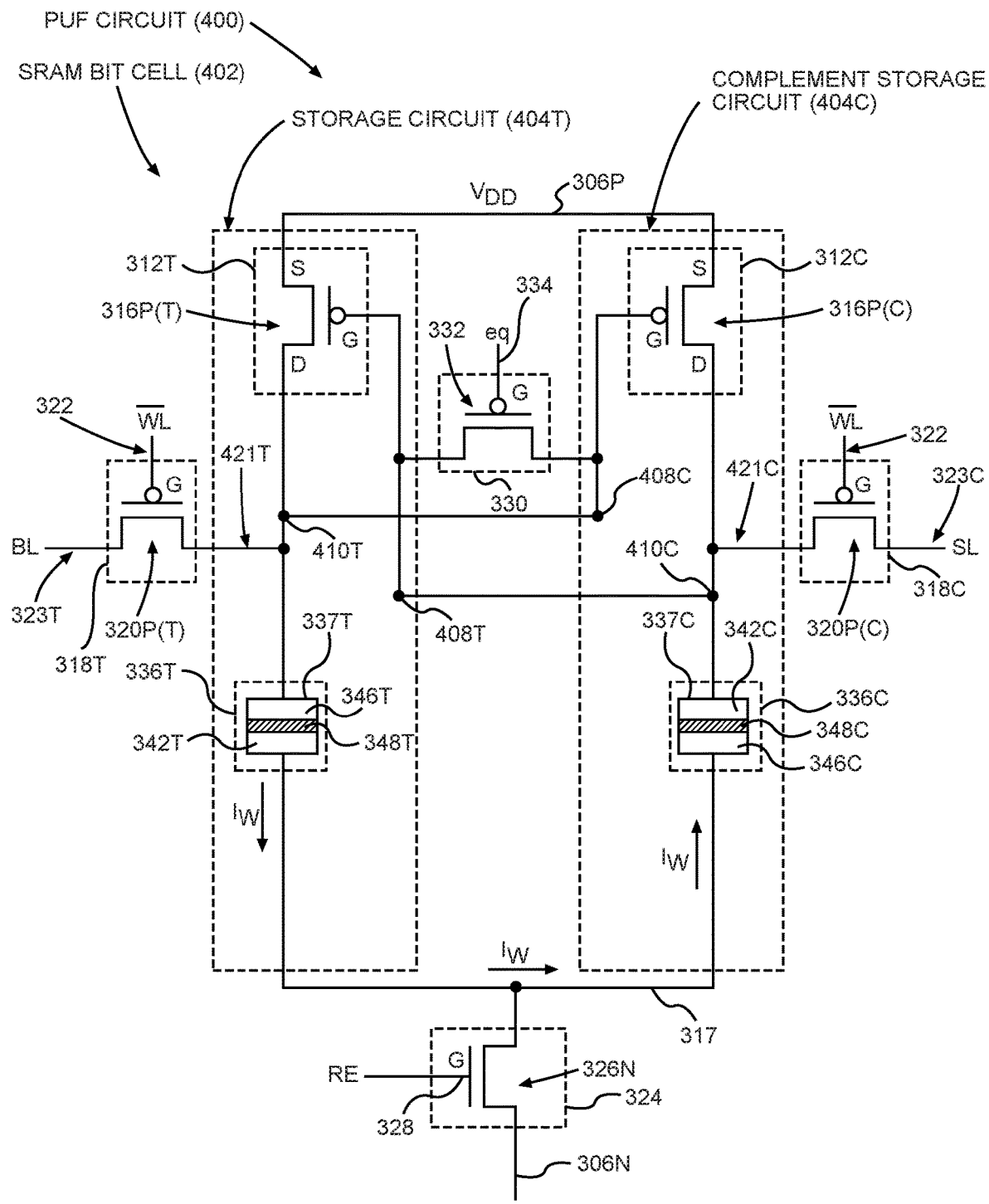
FIG. 4 is a schematic diagram of an exemplary PUF circuit in the form of an SRAM bit cell with passive NV resistance elements in the form of MTJs in place of respective complementary pull-down NFETs and coupled to respective complementary PUF output nodes and drains of respective cross-coupled complementary pull-up PFETs, to enhance imbalance between the complementary pull-up PFETs and reduce or eliminate transistor noise as a result of changes in temperature, voltage variations, and aging effect that would otherwise occur if the replaced pull-down NFETs were present in the PUF circuit.

In this regard, FIG. 4 is an exemplary PUF circuit 400 in the form of a SRAM bit cell 402 that includes the complementary passive NV resistance elements 336T, 336C in the SRAM bit cell 300 in FIG. 3A to better control the differential resistances on an output node 410T and complement output node 410C and enhance imbalance for increased PUF output reproducibility. By "passive," it is meant that the complementary passive NV resistance elements 336T, 336C are provided by a passive component (e.g., a resistor, a magnetic tunnel junction (MTJ), a resistive rRAM resistance, etc.) that do not require electrical power to provide resistance. By "NV," it is meant that the complementary passive NV resistance elements 336T, 336C are NV elements that retain their resistance over a power cycle.

In this example, the complementary passive NV resistance elements 336T, 336C are the MTJs 337T, 337C in the SRAM bit cell 300 in FIG. 3A. The MTJs 337T, 337C are passive resistance elements in that their resistance is not based on the application of power, but rather the magnetic orientation of their respective pinned and free layers. The MTJs 337T, 337C are also NV resistance elements in that the MTJs 337T, 337C retain their resistance over power cycles, because their respective pinned and free layers retain their magnetic orientation over power cycles. However, it is noted that the complementary passive NV resistance elements 336T, 336C can be provided in the form of other NV resistance elements (e.g., resistive RAM (rRAM)). In the PUF circuit 400 in FIG. 4, the pull-down NFETs like the pull-down NFET 316N(T) and complement pull-down NFET 316N(C) in the SRAM bit cell 300 in FIG. 3A are not present. The complementary passive NV resistance elements 336T, 336C completely replace the pull-down NFETs, like the pull-down NFET 316N(T) and complement pull-down NFET 316N(C) in the SRAM bit cell 300 in FIG. 3A. The storage circuit 404T and complement storage circuit 404C include a single FET in this example, which are the respective pull-up PFET 316P(T) and complement pull-up PFET 316P(C). The storage circuit 404T and complement storage circuit 404C in this example do not contain any other FETs other than the respective pull-up PFET 316P(T) and complement pull-up PFET 316P(C). The passive NV resistance element 336T is directly coupled to the output node 410T, pull-up PFET 316P(T), and read-enable node 317. The complement passive NV resistance element 336C is directly coupled to the complement output node 410C, complement pull-up PFET 316P(C), and the read-enable node 317. Eliminating the pull-down NFETs reduces or eliminates transistor noise in the PUF circuit 400 that would be caused by the pull-down NFETs as a result of changes in temperature, voltage variations, and aging effect that would otherwise occur if the replaced pull-down NFETs were present in the PUF circuit 400.

The PUF circuit 400 in FIG. 4 is the SRAM bit cell 402 that is a 4-transistor (T) (4-T) static complement memory bit cell. Elements that are common between the SRAM bit cell 300 in FIG. 3A and the SRAM bit cell 402 of the PUF circuit 400 in FIG. 4 are shown with common element numbers, and thus will not be re-described. The PUF circuit 400 in FIG. 4 includes storage circuit 404T and complement storage circuit 404C powered by a positive supply voltage $V_{DD}$ on a positive voltage rail 306P. The storage circuit 404T and complement storage circuit 404C include respective input and complement input nodes 408T, 408C, and respective output and complement output nodes 410T, 410C. The storage circuit 404T and complement storage circuit 404C are each configured to generate respective PUF output data 421T, 421C representing data on its respective output and complement output nodes 410T, 410C that is an inverted logic state of a signal representing data on its respective complement input node 408C and input node 408T. The storage circuit 404T and complement storage circuit 404C reinforce each other to retain data in the form of a voltage on a respective output node 410T and a complement output node 410C by their respective output and complement output nodes 410T, 410C being coupled to the respective complement input and input nodes 408C, 408T.

With continuing reference to FIG. 4, the storage circuit 404T and complement storage circuit 404C include the respective pull-up circuit 312T and complement pull-up circuit 312C in the form of the pull-up and complement pull-up PFETs 316P(T), 316P(C), which are coupled between the positive voltage rail 306P and the respective output node 410T and complement output node 410C. However, in the PUF circuit 400 in FIG. 4, the pull-down and complement pull-down NFETs 316N(T), 316N(C) in the SRAM bit cell 300 in FIG. 3A are not provided. The passive NV resistance element 336T is directly coupled between the output node 410T and the read-enable node 317. The complement passive NV resistance element 336C is directly coupled between the complement output node 410C and the read-enable node 317. In this manner, noise and aging effect that would otherwise be present in the PUF circuit 400 by the inclusion of pull-down and complement pull-down NFETs 316N(T), 316N(C) (like in the SRAM bit cell 300 in FIG. 3A) are removed, thus improving the reproducibility of the PUF output response of the PUF circuit 400, and thus improving the bit error rate (BER) of the PUF circuit 400. The resistances between the respective output node 410T, the complement output node 410C, and the read-enable node 317 are constant over variations in operating voltage, because the resistances of the respective passive NV resistance element 336T and complement passive NV resistance element 336C remain constant over variations in operating voltage and are not subject to transistor aging effects in this example.

With continuing reference to FIG. 4, in a read operation to the PUF circuit 400, the bit line BL and source line SL are pre-charged to a same voltage, which in this example is a voltage based on the positive supply voltage $V_{DD}$. Then, the word line signal 322 of an access-enable state (e.g., a higher voltage) is asserted on a word line WL coupled to gates G of the access and complement access PFETs 320P(T), 320P(C) to evaluate the differential voltages on the output node 410T and complement output node 410C to read the PUF circuit 400. Activation of the access and complement access PFETs 320P(T), 320P(C) will couple the respective bit line BL and source line SL to the output node 410T and complement output node 410C. Deactivation of the access and complement access PFETs 320P(T), 320P(C) will decouple the respective bit line BL and source line SL from the output node 410T and complement output node 410C. If a logic high voltage level (i.e., a '1') is stored at the output node 410T, a logic low voltage level (i.e., '0') is stored at the complement output node 410C. If a logic low voltage level (i.e., a '0') is stored at the output node 410T, a logic high voltage level (i.e., '1') is stored at the complement output node 410C. Activation of the word line WL with a low logic signal will cause the access and complement access PFETs 320P(T), 320P(C) to discharge the voltages on the output node 410T and complement output node 410C to the respective bit line BL and source line SL as PUF output data 421T and complement PUF output data 421C (that has a complementary logic state to PUF output data 421T) of the PUF circuit 400.

With continuing reference to FIG. 4, in a write operation to the PUF circuit 400, the bit line BL and source line SL are charged with PUF write data 323T and complement PUF write data 323C (that has a complement logic state to PUF write data 323T) to be written to the output or complement output nodes 410T, 410C. The write data charged on the bit line BL and source line SL have complementary logic values, unlike when a read operation is performed. Then, the word line signal 322 of an access-enable state (e.g., a higher voltage value) is asserted on a word line WL coupled to gates G of the access and complement access PFETs 320P (T), 320P(C). If a logic high voltage level (i.e., a '1') is stored at the output node 410T, a logic low voltage level (i.e., '0') is stored at the complement output node 410C. If a logic low voltage level (i.e., a '0') is stored at the output node 410T, a logic high voltage level (i.e., '1') is stored at the complement output node 410C. The word line signal 322 in an access-enable state on the word line WL to activate the access and complement access PFETs 320P(T), 320P(C) will cause the write data on the bit line BL and source line SL to pass through the access and complement access PFETs 320P(T), 320P(C) to the output or complement output nodes 410T, 410C as PUF write data.

In this example, eliminating the pull-down NFETs in the PUF circuit 400 and coupling the MTJs 337T, 337C directly between their respective complement output nodes 410T, 410C and a common node, which is the read-enable node 317 in this example, also supports a write-back operation after a PUF read operation. In this regard, as discussed in more detail below, the PUF circuit 400 is designed so that after a PUF read operation is performed, where the PUF output data and complement PUF output data 321T, 321C are present on the output node 410T and complement output node 410C, the generated PUF output data and complement PUF output data 321T, 321C, as a result of the PUF read operation, is used in a write-back mode to cause a write current $I_W$ to flow from one MTJ 337T to its complementary MTJ 337C to cause a memory state to be stored (i.e., written) in the programmable MTJs 337T, 337C. Storing a memory state in the MTJs 337T, 337C allows controlling of their resistances to reset the PUF circuit 400 for a subsequent read operation. Further, as an example shown in FIG. 4, the MTJs 337T, 337C can be reverse connected to each other with the pinned magnetization layer 342T of MTJ 337T coupled to the free magnetization layer 346C of MTJ 337C. This allows the same write current $I_W$ to program the MTJs 337T, 337C to the opposite memory state (e.g., P vs. AP) to further skew the PUF circuit 400 based on its inherent imbalance, thus causing the PUF circuit to stabilize the respective output and complement output nodes 410T, 410C faster on subsequent PUF read operations to the PUF circuit 400. Alternatively, the MTJs 337T, 337C could be arranged where the pinned magnetization layer 342C of MTJ 337C is coupled to the free magnetization layer 346T of MTJ 337T.

Figure 5:
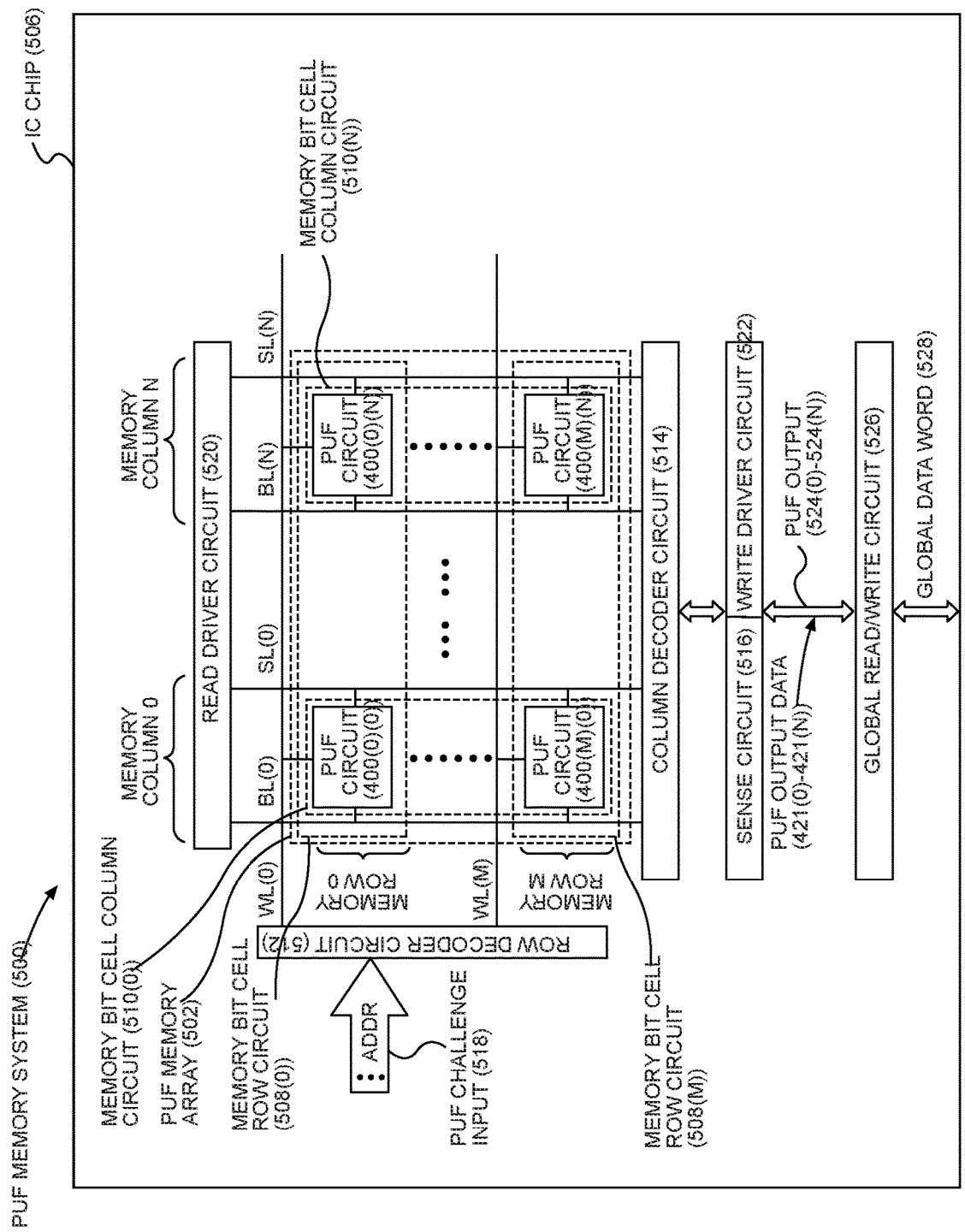
FIG. 5 is a schematic diagram of a PUF memory system that includes a memory array comprising a plurality of the PUF circuits in FIG. 4 addressable by rows and columns, and supporting access circuitry.

The PUF circuit 400 in FIG. 4 can be provided as bit cells in a memory array to provide a PUF memory system. In this regard, FIG. 5 is a block diagram of an exemplary PUF memory system 500 that includes a PUF memory array 502. The PUF memory array 502 in this example includes a plurality of the PUF circuits 400(0)(0)-400(M)(N) in memory rows 'M+1' and memory columns 'N+1.' The PUF memory system 500 may be provided on a separate IC chip 506 from a processor or integrated into a same IC chip as a processor. In this example, the PUF memory array 502 includes the plurality of the PUF circuits 400(0)(0)-404(M)(N) organized into 'M+1' memory rows 0-M and 'N+1' memory columns 0-N. Each PUF circuit 400(0)(0)-400(M)(N) is configured to generate a PUF output data with logic states representing stored memory states in the selected memory rows 0-M of PUF circuits 400( )(0)-400( )(N) in this example. The PUF memory array 502 includes a plurality of memory bit cell row circuits 508(0)-508(M) each provided in a respective memory row 0-M. Each memory bit cell row circuit 508(0)-508(M) includes a plurality of the PUF circuits 400( )(0)-400( )(N) each provided in a respective memory column 0-N for generating a PUF output data on a PUF output 524(0)-524(N). The PUF circuits 400(0)(0)-400(M)(N) are also organized in their respective memory columns 0-N to form respective memory bit cell column circuits 510(0)-510(N). Each memory bit cell column circuit 510(0)-510(N) includes a plurality of the PUF circuits 400(0)( )-400(M)( ) each provided in a respective memory row 0-M.

With continuing reference to FIG. 5, the PUF memory system 500 includes a row decoder circuit 512, a column decoder circuit 514, and a sense circuit 516 in this example. The row decoder circuit 512 is coupled to the PUF memory array 502 via word lines WL(0)-WL(M). Word lines WL(0)-WL(M) are coupled to the PUF circuits 400(0)(0)-400(M)(N) in the respective memory bit cell row circuits 508(0)-508(M). The row decoder circuit 512 is configured to assert one or more word lines WL(0)-WL(M) in response to a particular memory address ADDR on a PUF challenge input 518 received by the PUF memory system 500 to initiate a PUF access (e.g., read) operation to the PUF memory array 502. The column decoder circuit 514 is coupled to the PUF memory array 502 via bit lines BL(0)-BL(N) and source lines SL(0)-SL(N). A read driver circuit 520 is provided and coupled to the memory bit cell column circuits 510(0)-510(N) to pre-charge the bit lines BL(0)-BL(N) and source lines SL(0)-SL(N) with voltages to set up a read operation to the PUF circuits 400(0)(0)-400(M)(N) in a selected memory bit cell row circuit 508(0)-508(M). A write driver circuit 522 is coupled to the memory bit cell column circuits 510(0)-510(N) to generate a write voltage on the bit lines BL(0)-BL(N) and source lines SL(0)-SL(N) to write data from a PUF circuit 400(0)(0)-400(M)(N) in a selected memory bit cell row circuit 508(0)-508(M).

With continuing reference to FIG. 5, the sense circuit 516 may be coupled to the PUF memory array 502 via the bit lines BL(0)-BL(N) and the source lines SL(0)-SL(N). The sense circuit 516 may be configured to generate a PUF output data 421(0)-421(N) on a PUF output 524(0)-524(N) of 'N+1' bit width. The logic states of the PUF output data 421(0)-421(N) on the PUF output 524(0)-524(N) is based on the sensed voltages on the bit lines BL(0)-BL(N) and the source lines SL(0)-SL(N) in response to a PUF read operation. The voltages of the bit lines BL(0)-BL(N) and the source lines SL(0)-SL(N) during a read phase are indicative of the memory state of PUF circuits 400(0)(0)-400(M)(N) coupled to the bit lines BL(0)-BL(N) and the source lines SL(0)-SL(N). For example, in response to a PUF read operation, the read driver circuit 520 asserts and de-asserts control signals to cause the PUF circuits 400(0)(0)-400(M)(N) in the selected memory bit cell row circuit 408(0)-408(M) according to the activated word line WL(0)-WL(M) generated by the row decoder circuit 512 to generate the PUF output data 421(0)-421(N) on the PUF output 524(0)-524(N). To illustrate, PUF output data 421(0)-421(N) (e.g., a "response") may be generated by the PUF memory array 502 in response to a particular memory address ADDR (e.g., a "challenge"). In this manner, the PUF memory array 502 may output different PUF output data 421(0)-421(N) (e.g., different "responses") based on different addresses (e.g., different "challenges"). The PUF output data 421(0)-421(N) can be provided to a global read/write circuit 526 to provide a global data word 528 in a processor.

Thus, as shown in FIG. 5, the PUF output data 421(0)-421(N) is generated on the PUF output 524(0)-524(N) by the PUF memory array 502. The PUF output data 421(0)-421(N) is based on the logic values corresponding directly to stored memory states in the PUF circuits 400(0)(0)-400(M)(N) in the selected memory bit cell row circuit 508(0)-508(M) addressed by the memory address ADDR as the PUF challenge input 518. In this example, the PUF memory array 502 is configured to repeatedly generate the same PUF output data 421(0)-421(N) in response to the same memory address ADDR on the PUF challenge input 518.

The PUF circuit 400 in FIG. 4 is also configured to be controlled in an enrollment operating mode in a first PUF operation performed in the PUF circuit 400 (after a reset, for example) to generate a PUF output data and complementary PUF output data 321T, 321C according to the skew of the PUF circuit 400. This causes the PUF circuit 400 to generate a random data output. However, as part of the enrollment operating mode, the PUF output data and complement PUF output data 321T, 321C generated by the PUF circuit 400 can be written-back to the MTJs 337T, 337C to opposite memory states, as discussed above, to further improve the reproducibility and BER of the PUF circuit 400 during subsequent read operations in a PUF read operating mode. In this regard, FIGS. 6A-6E discussed below are provided to illustrate current flow for various enrollment processes as part of enrollment operating modes of the PUF circuit 400. FIGS. 7A-7E discussed below are signal diagrams illustrating exemplary signal levels of signals asserted to the PUF circuit 400 in FIG. 4 to control the enrollment operating modes illustrated in FIGS. 6A-6E, respectively. FIGS. 6A-6E and 7A-7E will now be described.

Figures 6A, 7A:
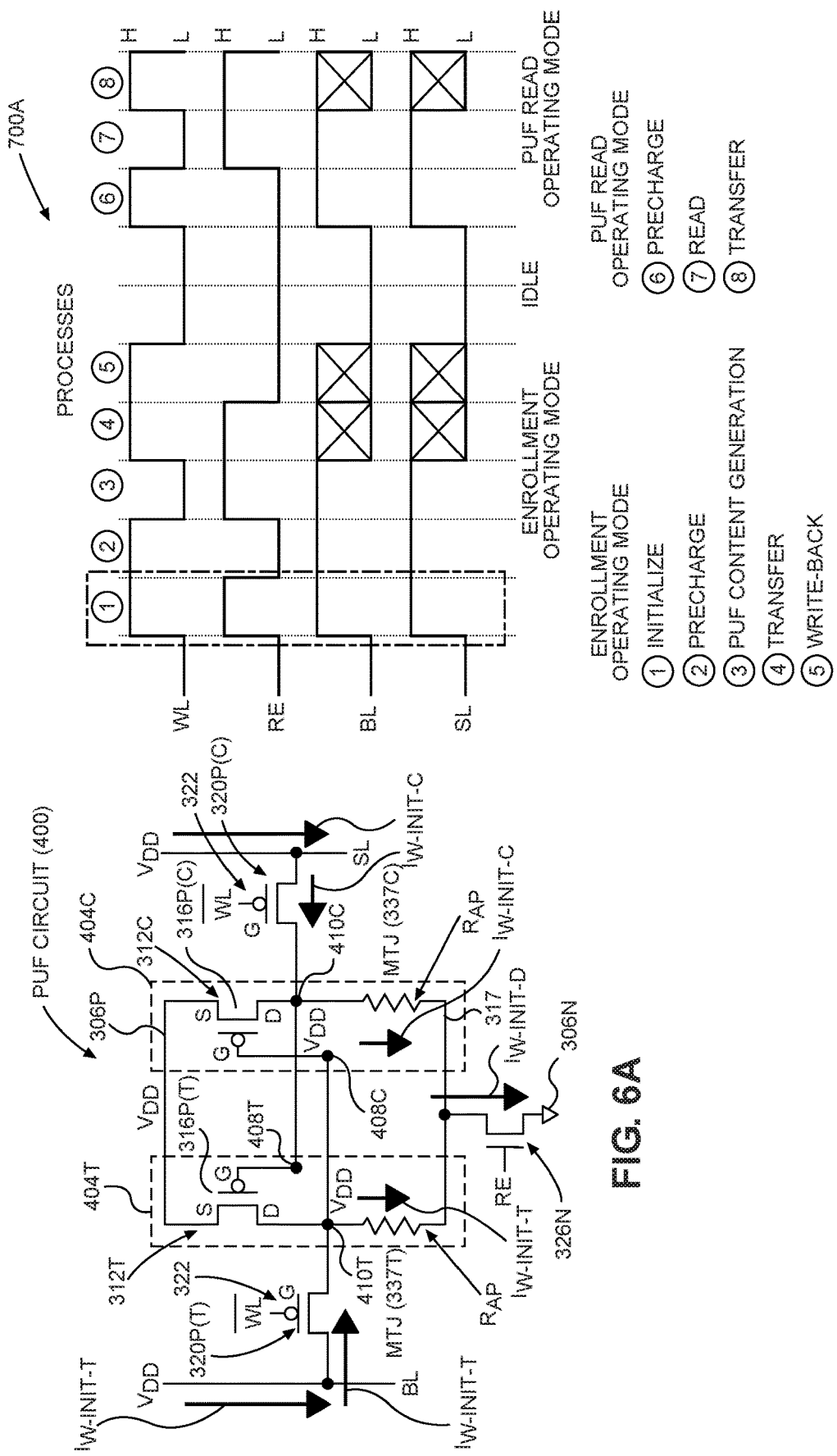

FIG. 6A illustrates current flow for an initialization process of an enrollment operating mode of the PUF circuit 400 based on the signals asserted as shown in the signal diagram 700A in FIG. 7A. The initialization process in this example is to initialize (i.e., write) the initial memory states of the MTJs 337T, 337C to the same memory state, which is the AP memory state R in this example. This initialization process is performed to reduce or eliminate the resistance skew between the MTJs 337T, 337C to achieve a random PUF response in a subsequent read operation. In this regard, a voltage $V_{DD}$ is asserted on the bit line BL and source line SL, as shown in process 1 in FIG. 7A, to generate a respective write current $I_{W\text{-}INIT\text{-}T}$ and complement write current $I_{W\text{-}INIT\text{-}C}$ to the respective output node 410T and complement output node 410C as shown in FIG. 6A. To provide current flow, the word line signal 322 is asserted as a logic high 'H' or '1' signal (e.g., voltage $V_{DD}$) in an access-enable state, as shown in process 1 in FIG. 7A, to activate or turn on access PFET 320P(T) and complement access PFET 320P(C), as shown in FIG. 6A. The read-enable signal RE is asserted as a logic high 'H' or '1' signal indicating a read-enable state, as shown in process 1 in FIG. 7A, to activate the read-enable NFET 326N to turn on, as shown in FIG. 6A. As shown in FIG. 6A, the write current and complement write current $I_{W\text{-}INIT\text{-}C}$ flow through the respective MTJs 337C, 337T and to the read-enable node 317, discharging through the read-enable NFET 326N to the voltage rail 306N. The same memory state is written to MTJs 337T, 337C because of their reverse connections, as previously discussed. The access and complement access PFETs 320P(T), 320P(C) are used in this example to pass a strong logic high signal (e.g., voltage $V_{DD}$) to the output node 410T and complement output node 410C. Note, however, that NFET access transistors could also be employed. A voltage boosting circuit could be employed, if needed or desired, to boost the voltage passed from the source and bit lines BL, SL to the output node 410T and complement output node 410C.

FIG. 6B illustrates current flow for a pre-charge process of the enrollment operating mode of the PUF circuit 400 based on the signals asserted as shown in the signal diagram 700B in FIG. 7B. The pre-charge process is performed to set up the PUF circuit 400 to generate an initial PUF response as PUF output data and complementary PUF output data 321T, 321C. In this regard, the read-enable signal RE is de-asserted as a logic low 'L' or '0' signal indicating a read-disable state, as shown in process 2 in FIG. 7B, to deactivate (i.e., turn-off) the read-enable NFET 326N, as shown in FIG. 6B. This is so that the pre-charge currents $I_{PRE-T}$, $I_{PRE-C}$ generated as a result of asserting voltage on the bit line BL and source SL, as shown in process 2 in FIG. 7B, charge the respective output node 410T and complement output node 410C as shown in FIG. 6B and are not discharged through the read-enable NFET 326N. The word line signal 322 continues to be asserted as a logic high 'H' or '1' signal (e.g., voltage $V_{DD}$) in an access-enable state, as shown in process 2 in FIG. 7B, to keep the access PFET 320P(T) and complement access PFET 320P(C) activated, as shown in FIG. 6B, to allow pre-charge currents $I_{PRE-T}$, $I_{PRE-C}$ to charge respective output node 410T and complement output node 410C to voltage $V_{DD}$.

FIG. 6C illustrates current flow for a PUF content generation process of the enrollment operating mode of the PUF circuit 400 based on the signals asserted as shown in the signal diagram 700C in FIG. 7C. The PUF content generation process is performed to cause the PUF circuit 400 to generate the initial PUF response as the PUF output data and complement PUF output data 321T, 321C based on the pre-charging of the output node 410T and complement output node 410C in the pre-charging process illustrated in FIGS. 6B and 7B. In this regard, the read-enable signal RE is asserted as a logic high 'H' or '1' signal indicating a read-enable state, as shown in process 3 in FIG. 7C, to deactivate (i.e., turn-off) the read-enable NFET 326N, as shown in FIG. 6C. The word line signal 322 is de-asserted as a logic low 'L' or '0' signal in a word line disable state, as shown in process 3 in FIG. 7C, to deactivate the access PFET 320P(T) and complement access PFET 320P(C). This causes PUF content generation currents $I_{GEN-T}$, $I_{GEN-C}$ to flow from the positive voltage rail 306P through the respective pull-up and complement pull-up pull-up PFETs 316P(T), 316P(C) and to the respective output and complement output nodes 410T, 410C. The difference in resistance of the MTJs 337T, 337C will cause different PUF content generation currents $I_{GEN-T'}$, $I_{GEN-C'}$ to flow through the respective MTJs 337T, 337C, thus causing one of the respective output and complement output nodes 410T, 410C to have less of a voltage drop, with the positive feedback forcing the respective output and complement output nodes 410T, 410C to opposite voltage states. For example, as shown in FIG. 6C, if the resistance of MTJ 337T is greater than the resistance of MTJ 337C, then the voltage drop at complement output node 410C will be less than at output node 410T, thus keeping pull-up PFET 316P(T) turned on longer. This causes the output node 410T to go to voltage $V_{DD}$ at positive voltage rail 306P and complement output node 410C to go to the on-resistance voltage at the voltage rail 306N, which will be almost ground (GND) voltage, or almost 0 V, in this example. Note that any variations in the resistances of the MTJs 337T, 337C affect the PUF response of the PUF circuit 400 more than any variations in the threshold voltages of the pull-up and complement pull-up PFETs 316P(T), 316P(C), because the pull-up and complement pull-up PFETs 316P(T), 316P(C) are initially turned off.

FIG. 6D illustrates current flow for a transfer process of the enrollment operating mode of the PUF circuit 400 based on the signals asserted as shown in the signal diagram 700D in FIG. 7D. The transfer process is performed to cause the PUF circuit 400 to transfer the generated PUF output data and complement PUF output data 321T, 321C resulting from the PUF content generation process in FIGS. 6C and 7C to the bit line BL and source line SL. In this regard, the read-enable signal RE is left asserted as a logic high 'H' or '1' signal indicating a read-enable state, as shown in process 4 in FIG. 7D. The word line signal 322 is asserted as a logic high 'H' or '1' signal in an access-enable state, as shown in process 4 in FIG. 7D, to activate the access PFET 320P(T) and complement access PFET 320P(C). This causes transfer currents $I_{TR-T}$, $I_{TR-C}$ to flow from the respective output and complement output nodes 410T, 410C to the respective bit line BL and source line SL to transfer the generated PUF output data and complement PUF output data 321T, 321C from the PUF circuit 400.

Figures 6E, 7E:
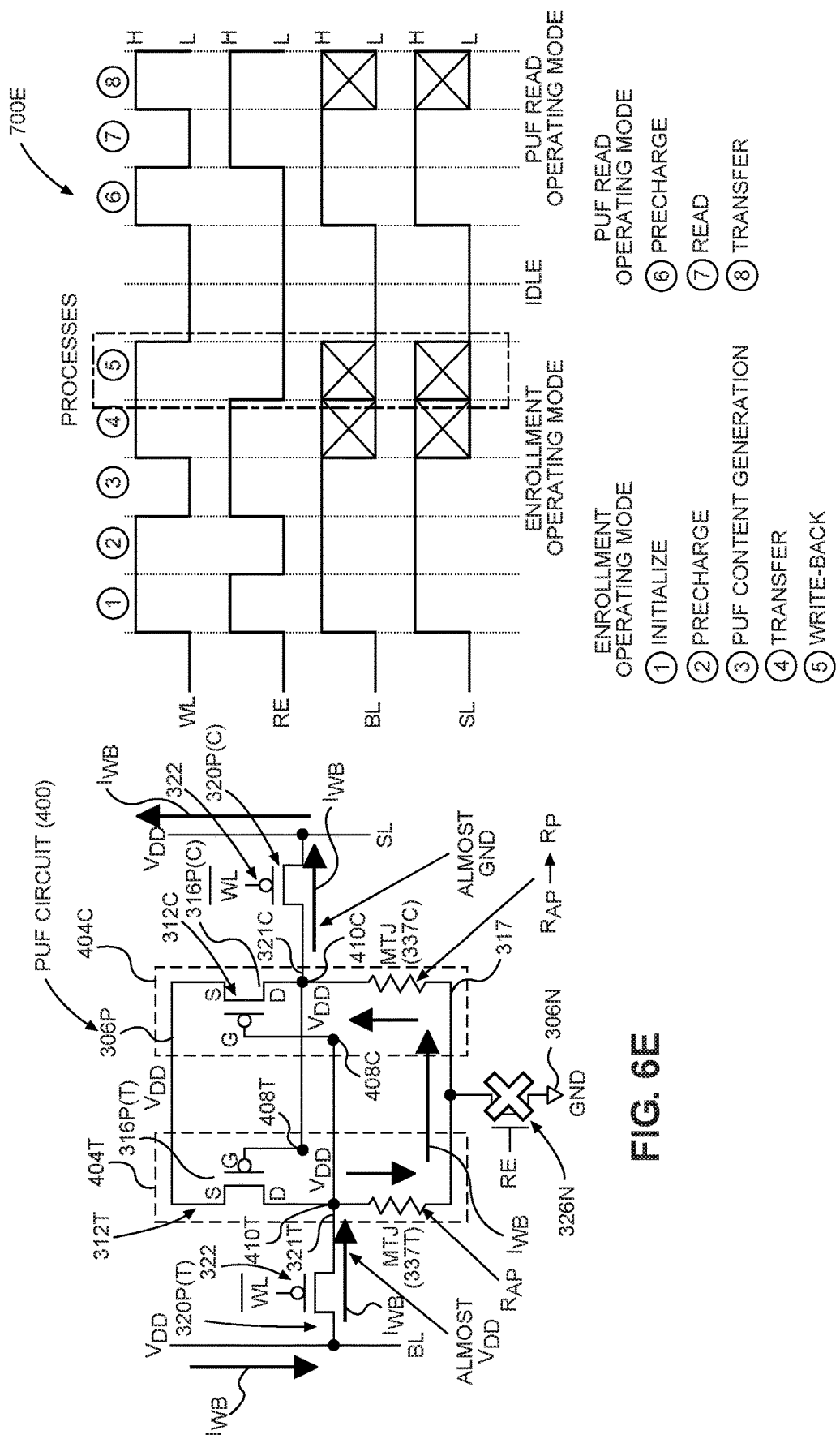

FIG. 6E illustrates current flow for a write-back process of the enrollment operating mode of the PUF circuit 400 based on the signals asserted as shown in the signal diagram 700E in FIG. 7E. The write-back process is performed to cause the PUF circuit 400 to use the generated PUF output data and complement PUF output data 321T, 321C on the output node 410T and complement output node 410C to set the memory states of the MTJs 337T, 337C to opposite memory states as respective write-back and complement write-back memory states based on their reverse connection for improved reproducibility and BER, as previously discussed. In this regard, the read-enable signal RE is de-asserted as a logic low 'L' or '0' signal indicating a read-disable state, as shown in process 5 in FIG. 7E, to deactivate (i.e., turn-off) the read-enable NFET 326N, as shown in FIG. 6E. The word line signal 322 is left asserted as a logic high 'H' or '1' signal in an access-enable state, as shown in process 5 in FIG. 7E, to leave the access and complement access PFETs 320P(T), 320P(C) able to provide a current flow path between the bit line BL and source line SL and the respective output and complement output nodes 410T, 410C. Because the PUF output data and complement PUF output data 321T, 321C, in the form of voltages on the bit line BL and source line SL, are in opposite voltage states, a write-back current $I_{WB}$ will flow from the bit line BL or source line SL at the higher voltage to the source line SL or bit line BL at the lower voltage. In FIG. 6E, the write-back current $I_{WB}$ flows from the output node 410T to the MTJ 337T and then to MTJ 337C to the complement output node 410C since the PUF output data 321T transferred to the bit line BL in the transfer process in FIGS. 6D and 7D was a higher voltage than the complement PUF output data 321C transferred to the source line SL. Because the MTJs 337T, 337C are reverse connected, the same write-back current $I_{WB}$ flowing through the MTJs 337T, 337C causes the magnetization states to be opposite. In this example, the magnetization state of MTJ 337C is changed from an AP to a P magnetization state. As previously discussed, this further skews the PUF circuit 400 for a new PUF read operation causing the PUF circuit 400 to stabilize the respective output and complement output nodes 410T, 410C faster on subsequent PUF read operations to the PUF circuit 400.

Figure 8:
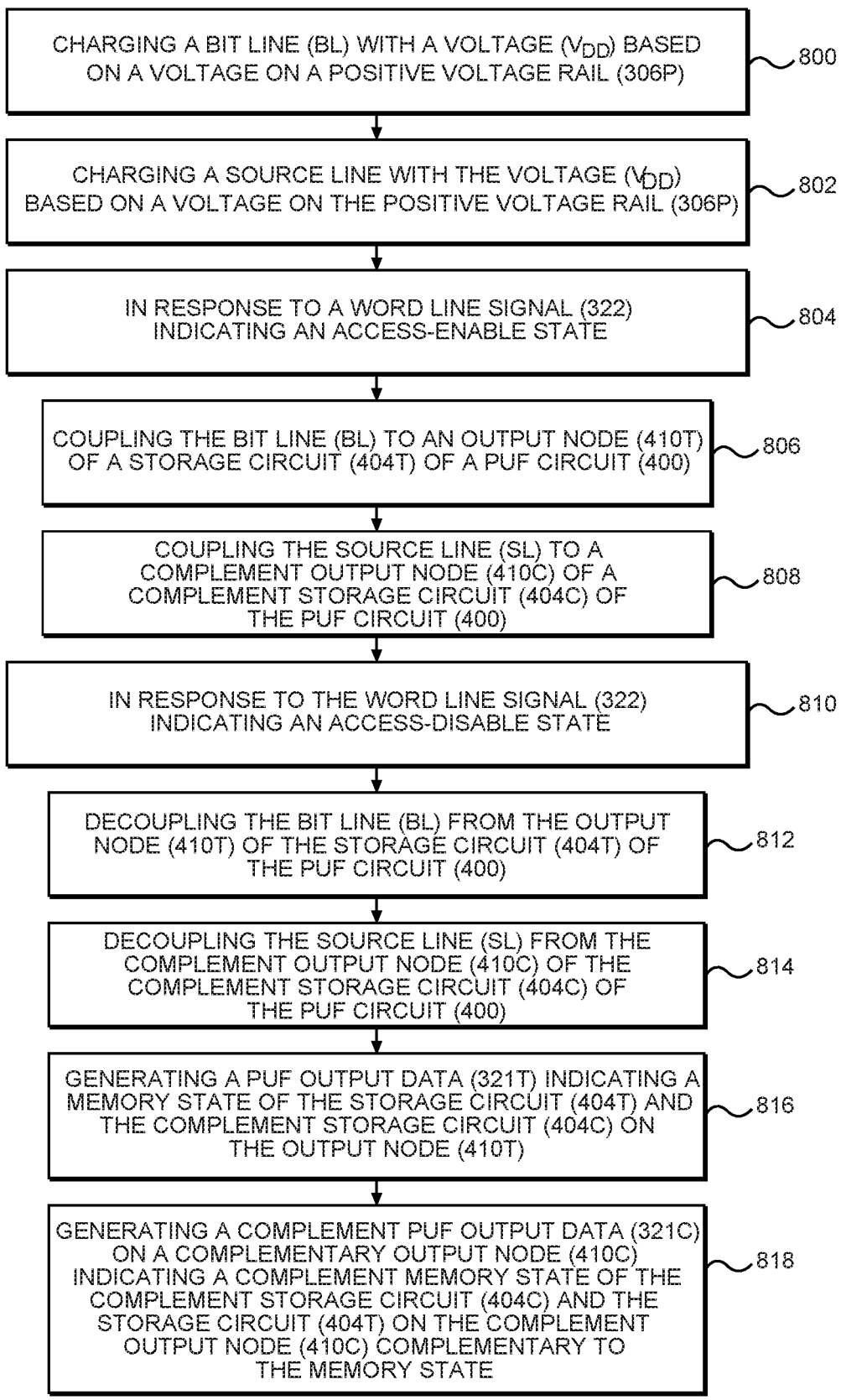
FIG. 8 is a flowchart illustrating exemplary pre-charge and PUF content generation processes of the enrollment operating mode of the PUF circuit in FIG. 4 according to the enrollment processes illustrated in FIGS. 6B, 6C, 7B, and 7C.

FIG. 8 is a flowchart illustrating an exemplary pre-charge and PUF content generation process of the enrollment operating mode of the PUF circuit 400 in FIG. 4 according to the enrollment processes illustrated in Figure sets 6B and 7B, and 6C and 7C, respectively. Reference will be made to the PUF circuit 400 in FIGS. 6B and 6C. In this regard, a first step in the pre-charging process of the enrollment operating mode is charging the bit line BL with a voltage $V_{DD}$ based on a voltage on the positive voltage rail 306P (block 800 in FIG. 8). A next step in the pre-charging process of the enrollment operating mode is charging the source line SL with a voltage $V_{DD}$ based on the voltage on the positive voltage rail 306P (block 802 in FIG. 8). In response to a word line signal 322 being asserted in an access-enable state, the access PFET 320P(T) and complement access PFET 320P(C) are activated (block 804 in FIG. 8). This causes coupling of the bit line BL to the output node 410T of the storage circuit 404T of the PUF circuit 400 (block 806 in FIG. 8), and coupling of the source line SL to the complement output node 410C of the complement storage circuit 404C of the PUF circuit 400 (block 808 in FIG. 8). In response to the word line signal 322 being asserted in an access-disable state, the access PFET 320P(T) and complement access PFET 320P(C) are turned off (block 810 in FIG. 8). This causes the decoupling of the bit line BL from the output node 410T of the storage circuit 404T of the PUF circuit 400 (block 812 in FIG. 8), and the decoupling of the source line SL from the complement output node 410C of the complement storage circuit 404C of the PUF circuit 400 (block 814 in FIG. 8). This causes the PUF circuit 400 to generate the PUF output data 321T indicating a memory state of the storage circuit 404T and the complement storage circuit 404C on the output node 410T (block 816 in FIG. 8), and to generate the complement PUF output data 321C indicating a complement memory state of the complement storage circuit 404C and the complement storage circuit 404C on the complement output node 410C (block 818 in FIG. 8).

Figures 9A, 10A:
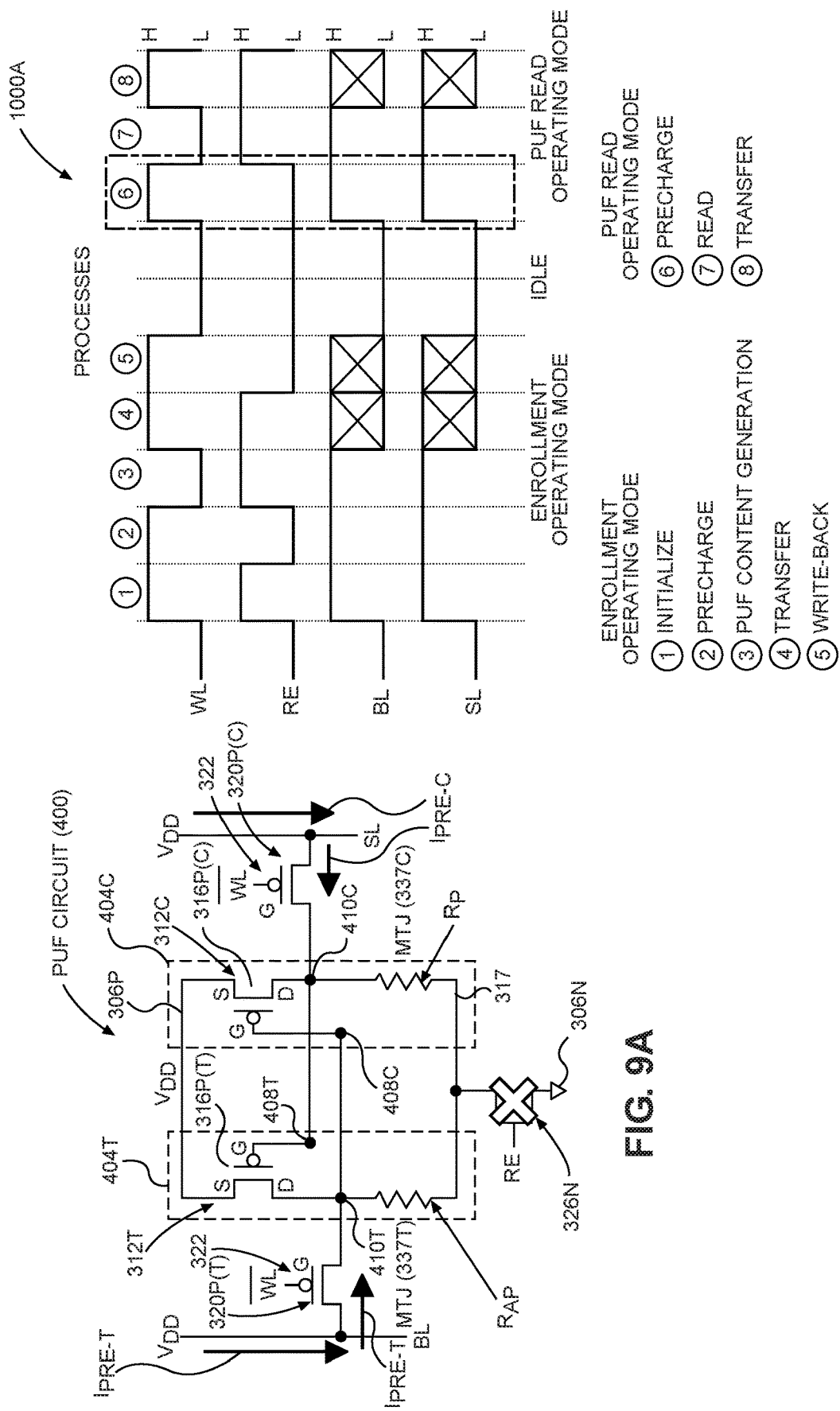
FIGS. 9A and 9B are diagrams illustrating current flows for exemplary PUF read processes for an exemplary PUF read operation mode of the PUF circuit in FIG. 4.
FIGS. 10A and 10B are signal diagrams illustrating exemplary signal levels of signals asserted to the PUF circuit in FIG. 4 to control current flows for the exemplary PUF read processes for the exemplary PUF read operation mode illustrated in FIGS. 9A and 9B, respectively.
Figures 9B, 10B:
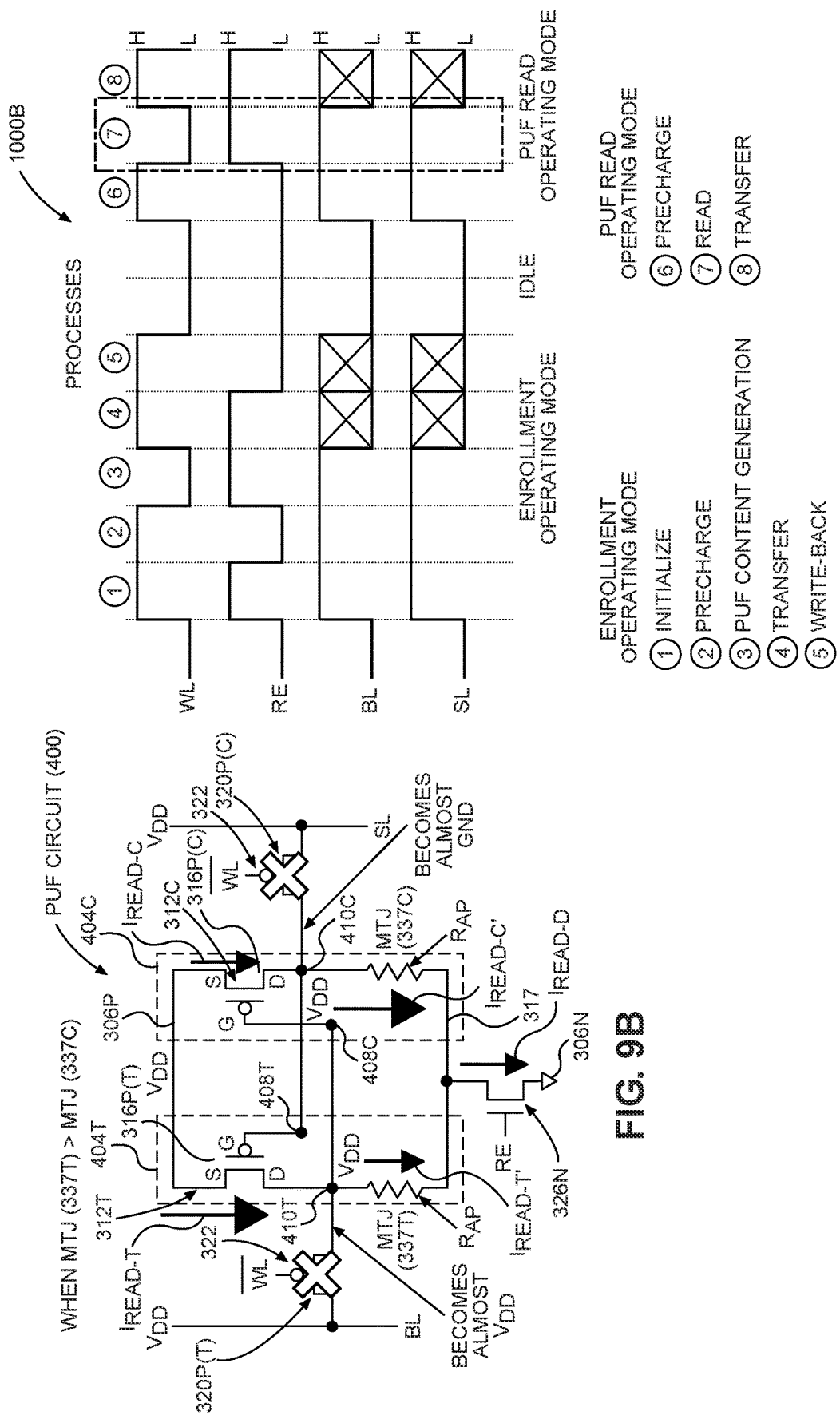

After the enrollment operating mode, the power source for the PUF circuit 400 can be decoupled or turned off in an idle mode (as shown in FIG. 7E) until a PUF read operation is desired to be performed, since the MTJs 337T, 337C are non-volatile memory devices. The PUF circuit 400 in FIG. 4 is also configured to be controlled in a PUF read operating mode to generate PUF output data and complement PUF output data 321T, 321C according to the skew of the PUF circuit 400 and the stored memory states in the MTJs 337T, 337C. If the write-back enrollment process has already been performed, the memory states in the MTJs 337T, 337C will be opposite to each other, as previously discussed. In this regard, FIGS. 9A and 9B discussed below are provided to illustrate current flow for various processes as part of a PUF read operating mode of the PUF circuit 400 to generate the PUF output data and complement PUF output data 321T, 321C. FIGS. 10A and 10B discussed below are signal diagrams illustrating exemplary signal levels of signals asserted to the PUF circuit 400 in FIG. 4 to control PUF read operating modes illustrated in FIGS. 9A and 9B, respectively. Figure sets 9A and 10A, and 9B and 10B will now be described.

FIG. 9A illustrates current flow for a pre-charge process of a PUF read operating mode of the PUF circuit 400 based on the signals asserted as shown in the signal diagram 1000A in FIG. 10A. The pre-charge process is performed to set up the PUF circuit 400 to generate a PUF response as PUF output data and complement PUF output data 321T, 321C. In this regard, the read-enable signal RE is de-asserted as a logic low 'L' or '0' signal indicating a read-disable state, as shown in process 6 in FIG. 10A, to deactivate (i.e., turn-off) the read-enable NFET 326N, as shown in FIG. 9A. This is so that the pre-charge currents $I_{PRE-T}$, $I_{PRE-C}$ generated as a result of asserting voltage on the bit line BL and source line SL, as shown in process 6 in FIG. 10A, charge the respective output node 410T and complement output node 410C, as shown in FIG. 6B, and are not discharged through the read-enable NFET 326N. The word line signal 322 continues to be asserted as a logic high 'H' or '1' signal (e.g., voltage $V_{DD}$) in an access-enable state, as shown in process 6 in FIG. 10A, to keep the access PFET 320P(T) and complement access PFET 320P(C) activated, as shown in FIG. 6B, to allow pre-charge currents $I_{PRE-T}$, $I_{PRE-C}$ to charge respective output node 410T and complement output node 410C to voltage $V_{DD}$.

FIG. 9B illustrates current flow for a PUF read process of the PUF read operating mode of the PUF circuit 400 based on the signals asserted as shown in the signal diagram 1000B in FIG. 10B. The PUF read process is performed to cause the PUF circuit 400 to generate the PUF response as the PUF output data and complement PUF output data 321T, 321C based on the pre-charging of the output node 410T and complement output node 410C in the pre-charging process illustrated in FIGS. 9A and 10A. In this regard, the read-enable signal RE is asserted as a logic high 'H' or '1' signal indicating a read-enable state, as shown in process 3 in FIG. 10B, to deactivate (i.e., turn-off) the read-enable NFET 326N, as shown in FIG. 9B. The word line signal 322 is de-asserted as a logic low 'L' or '0' signal in a word line disable state, as shown in process 3 in FIG. 10B, to deactivate the access PFET 320P(T) and complement access PFET 320P(C). This causes PUF content generation currents $I_{READ-T}$, $I_{READ-C}$ to flow from the positive voltage rail 306P through the pull-up and complement pull-up PFETs 316P(T), 316P(C) and to the respective output and complement output nodes 410T, 410C. The difference in resistance of the MTJs 337T, 337C will cause different PUF content generation currents $I_{READ-T'}$, $I_{READ-C'}$ to flow through the respective MTJs 337T, 337C, thus causing one of the respective output and complement output nodes 410T, 410C to have less of a voltage drop, with the positive feedback forcing the respective output and complement output nodes 410T, 410C to opposite voltage states. For example, as shown in FIG. 9B, if the resistance of MTJ 337T is greater than the resistance of MTJ 337C, then the voltage drop at complement output node 410C will be less than at output node 410T, thus keeping pull-up PFET 316P(T) turned on longer, causing output node 410T to go to voltage $V_{DD}$ at positive voltage rail 306P and complement output node 410C to go to the voltage at the voltage rail 306N, minus the threshold voltage of the read-enable NFET 326N, which will be almost ground (GND) voltage. Note that any variations in the resistances of the MTJs 337T, 337C affect the PUF response of the PUF circuit 400 more than any variations in the threshold voltages of the pull-up and complement pull-up PFETs 316P(T), 316P(C), because the pull-up and complement pull-up PFETs 316P(T), 316P(C) are initially turned off.

After the PUF read processes of the PUF read operating mode of the PUF circuit 400 illustrated in FIGS. 9B and 10B is completed, the PUF output data and complement PUF output data 321T, 321C can be transferred to the source line SL and bit line BL according to the same transfer processes in the PUF enrollment operating mode in FIGS. 6D and 7D previously discussed.

Figure 11:
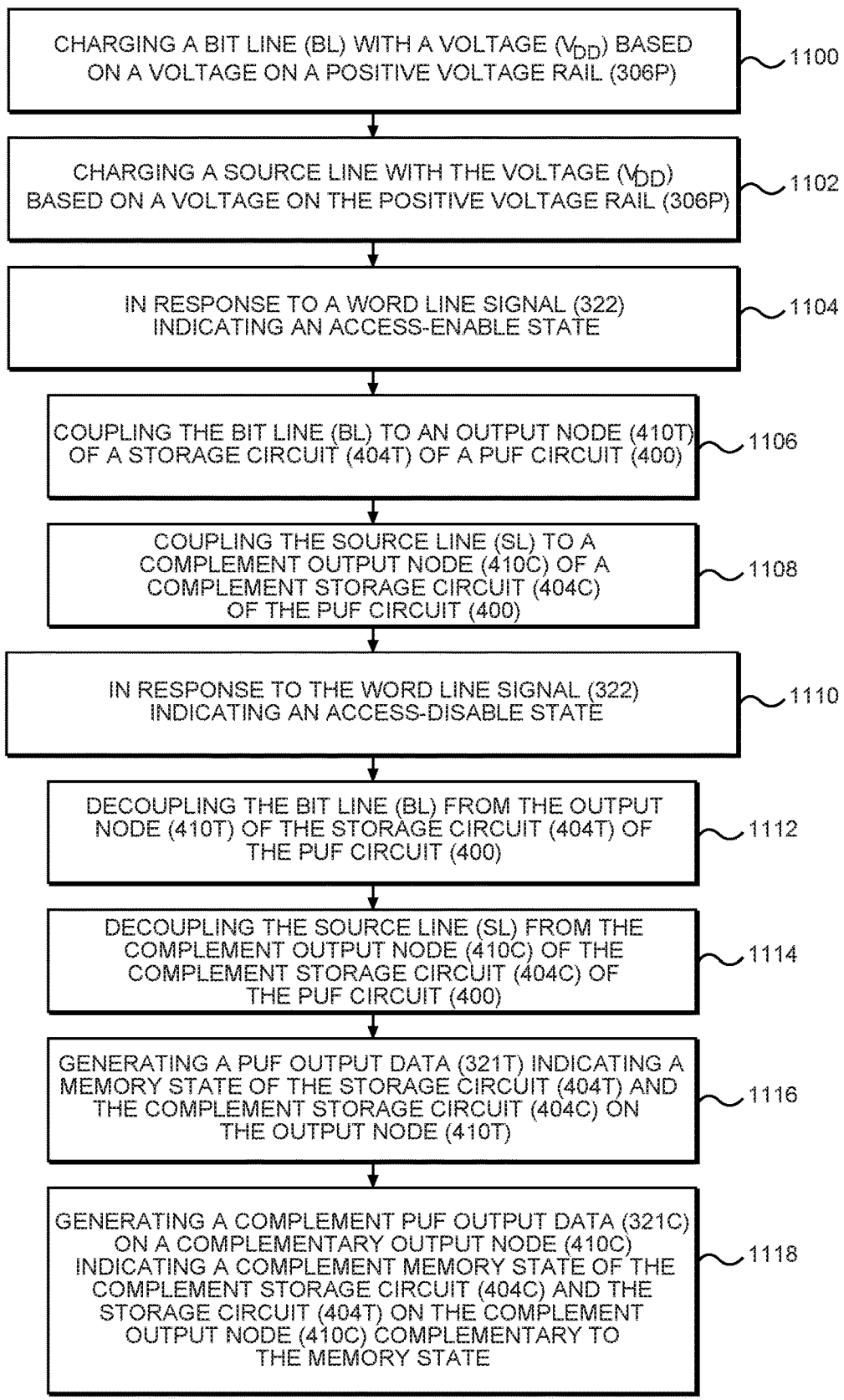
FIG. 11 is a flowchart illustrating an exemplary process of performing PUF read processes for an exemplary PUF read operation mode to the PUF circuit in FIG. 4 according to the read operating modes illustrated in FIGS. 9A-10B.

FIG. 11 is a flowchart illustrating an exemplary pre-charge and PUF read process of the PUF read operating mode of the PUF circuit 400 in FIG. 4 according to the enrollment processes illustrated in Figure sets 9A and 10A, and 9B and 10B, respectively. Reference will be made to the PUF circuit in FIGS. 9A and 9B. In this regard, a first step in the pre-charging process of the enrollment operating mode is charging the bit line BL with a voltage $V_{DD}$ based on a voltage on the positive voltage rail 306P (block 1100 in FIG. 11). A next step in the pre-charging process of the enrollment operating mode is charging the source line SL with a voltage $V_{DD}$ based on the voltage on the positive voltage rail 306P (block 1102 in FIG. 11). In response to a word line signal 322 being asserted in an access-enable state, the access PFET 320P(T) and complement access PFET 320P(C) are activated (block 1104 in FIG. 11). This causes coupling of the bit line BL to the output node 410T of the storage circuit 404T of the PUF circuit 400 (block 1106 in FIG. 11), and coupling of the source line SL to the complement output node 410C of the complement storage circuit 404C of the PUF circuit 400 (block 1108 in FIG. 11). In response to the word line signal 322 being asserted in an access-disable state, the access PFET 320P(T) and complement access PFET 320P(C) are turned off (block 1110 in FIG. 11). This causes the decoupling of the bit line BL from the output node 410T of the storage circuit 404T of the PUF circuit 400 (block 1112 in FIG. 8), and the decoupling of the source line SL from the complement output node 410C of the complement storage circuit 404C of the PUF circuit 400 (block 1114 in FIG. 11). This causes the PUF circuit 400 to generate the PUF output data 321T indicating a memory state of the storage circuit 404T and the complement storage circuit 404C on the output node 410T (block 1116 in FIG. 11), and to generate the complement PUF output data 321C indicating a complement memory state of the complement storage circuit 404C and the complement storage circuit 404C on the complement output node 410C (block 1118 in FIG. 11).

As discussed above, the PUF circuit 400 replaces pull-down NFETs like the pull-down NFET 316N(T) and complement pull-down NFET 316N(C) in the SRAM bit cell 300 in FIG. 3A with complementary passive NV resistance elements 336T, 336C in FIG. 4. In an alternative example, the pull-up PFET 316P(T) and complement pull-up PFET 316P(C) in the SRAM bit cell 300 in FIG. 3A could be replaced with the complementary passive NV resistance elements 336T, 336C, and the pull-down NFET 316N(T) and complement pull-down NFET 316N(C) be retained to provide a PUF circuit that is noise tolerant.

Figure 12:
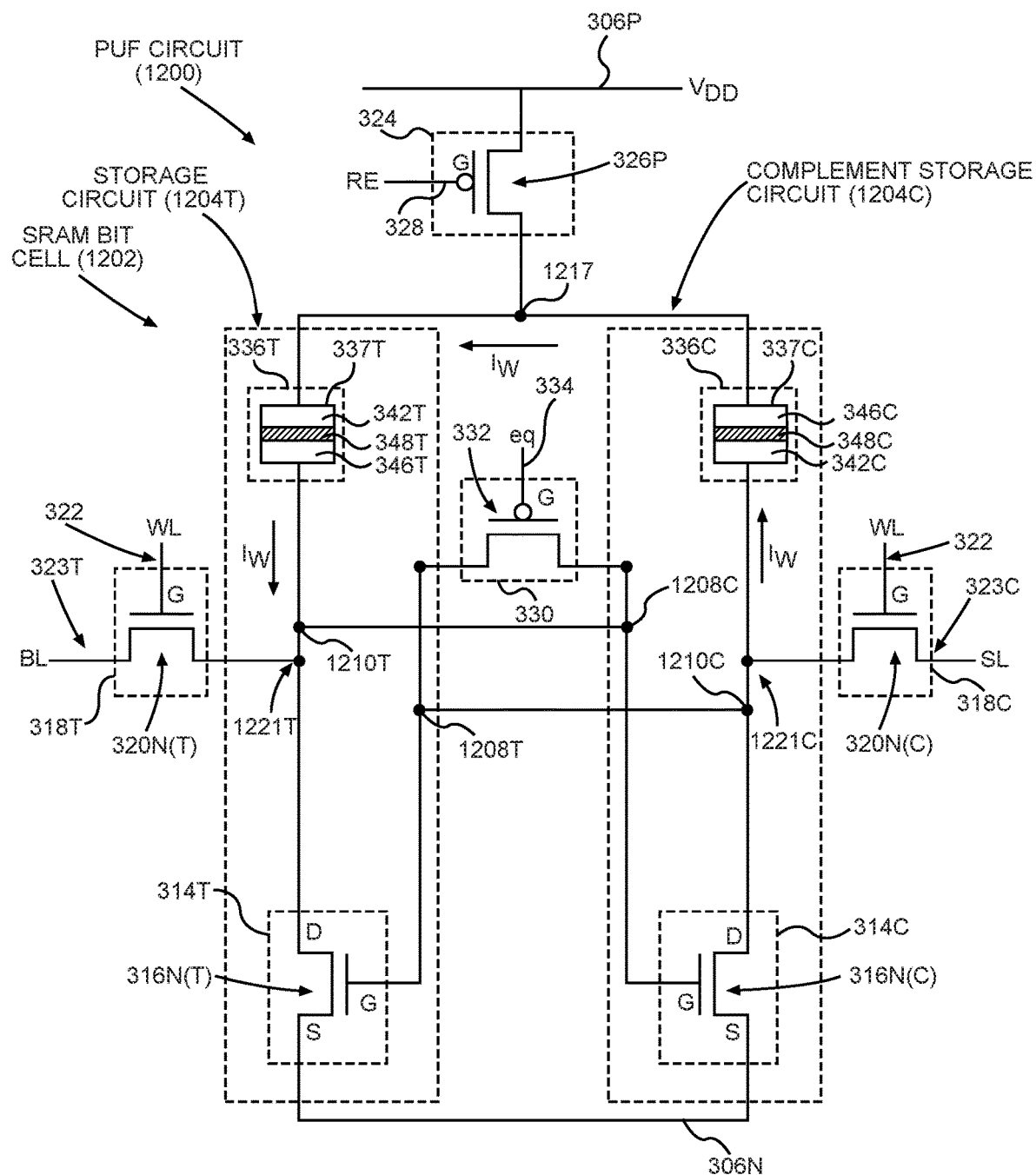
FIG. 12 is a schematic diagram of another exemplary PUF circuit in the form of an SRAM bit cell with passive NV resistance elements in the form of MTJs in place of respective complement pull-up PFETs and coupled to respective complement PUF output nodes and drains of respective cross-coupled complement pull-up PFETs to enhance imbalance between the complement pull-up PFETs and reduce or eliminate transistor noise as a result of changes in temperature, voltage variations, and aging effect that would otherwise occur if the replaced pull-up PFETs were present in the PUF circuit.

In this regard, FIG. 12 is an exemplary PUF circuit 1200 in the form of an SRAM bit cell 1202 that include the complementary passive NV resistance elements 336T, 336C in the SRAM bit cell 300 in FIG. 3A to better control the differential resistances on an output node 1210T and complement output node 1210C and enhance imbalance for increased PUF output reproducibility. In the PUF circuit 1200 in FIG. 12, the pull-up PFETs, like the pull-up PFET 316P(T) and complement pull-up PFET 316P(C) in the SRAM bit cell 300 in FIG. 3A, are not present. The complementary passive NV resistance elements 336T, 336C completely replace the pull-up PFETs like the pull-up PFET 316P(T) and complement pull-up PFET 316P(C) in the SRAM bit cell 300 in FIG. 3A. A storage circuit 1204T and complement storage circuit 1204C in the PUF circuit 1200 each include a single FET in this example, which are the respective pull-down NFET 316N(T) and complement pull-down NFET 316N(C). The storage circuit 1204T and complement storage circuit 1204C in this example do not contain any other FETs other than the respective pull-down NFET 316N(T) and complement pull-down NFET 316N(C). The passive NV resistance element 336T is directly coupled to the output node 1210T of the storage circuit 1204T, the pull-down NFET 316N(T), and a read-enable node 1217. The complement passive NV resistance element 336C is directly coupled to a complement output node 1210C of the complement storage circuit 1204C, the complement pull-down NFET 316N(C), and the read-enable node 1217. Eliminating the pull-up PFETs reduces or eliminates transistor noise in the PUF circuit 400 as a result of changes in temperature, voltage variations, and aging effect that would otherwise occur if the replaced pull-up PFETs were present in the PUF circuit 400.

The PUF circuit 1200 in FIG. 12 is the SRAM bit cell 1202 that is a 4-transistor (T) (4-T) static complement memory bit cell. Elements that are common between the SRAM bit cell 300 in FIG. 3A and the SRAM bit cell 1202 of the PUF circuit 1200 in FIG. 12 are shown with common element numbers, and thus will not be re-described. The PUF circuit 1200 in FIG. 12 includes the storage circuit 1204T and the complement storage circuit 1204C powered by a positive supply voltage $V_{DD}$ on a positive voltage rail 306P. The storage circuit 1204T and complement storage circuit 1204C include respective input and complement input nodes 1208T, 1208C, and respective output and complement output nodes 1210T, 1210C. The storage circuit 1204T and the complement storage circuit 1204C are each configured to generate respective PUF output data and complement PUF output data 1221T, 1221C representing data on its respective output and complement output nodes 1210T, 1210C that is an inverted logic state of a signal representing data on its respective complement input node 1208C and input node 1208T. The storage circuit 1204T and complement storage circuit 1204C reinforce each other to retain data in the form of a voltage on a respective output node 1210T and a complement output node 1210C by their respective output and complement output nodes 1210T, 1210C being coupled to the respective complement input and input nodes 1208C, 1208T.

With continuing reference to FIG. 12, the storage circuit 1204T and complement storage circuit 1204C include the respective pull-down circuit 314T and complement pull-down circuit 314C in the form of the pull-down and complement pull-down NFETs 316N(T), 316N(C), which are coupled between the voltage rail 306N and the respective output node 1210T and complement output node 1210C. The passive NV resistance element 336T is directly coupled between the output node 1210T and the read-enable node 1217. The complement passive NV resistance element 336C is directly coupled between the complement output node 1210C and the read-enable node 1217. In this manner, noise and aging effect that would otherwise be present in the PUF circuit 1200 by the inclusion of pull-up and complement pull-up PFETs 316P(T), 316P(C) (like in the SRAM bit cell 300 in FIG. 3A) are removed, thus improving the reproducibility of the PUF output response of the PUF circuit 400, and thus improving the bit error rate (BER) of the PUF circuit 400. The resistances between the respective output node 1210T and the complement output node 1210C, and the read-enable node 1217 are constant over variations in operating voltage, because the resistances of the respective passive NV resistance element 336T and complement passive NV resistance element 336C remain constant over variations in operating voltage and are not subject to transistor aging effects.

With continuing reference to FIG. 12, in a read operation to the PUF circuit 1200, the bit line BL and source line SL are pre-charged with voltage based on the positive supply voltage $V_{DD}$. Then, the word line signal 322 of an access-enable state (e.g., a higher voltage) is asserted on a word line WL coupled to gates G of access and complement access NFETs 320N(T), 320N(C) to evaluate the differential voltages on the output node 1210T and complement output node 1210C to read the PUF circuit 1200. Activation of the access and complement access NFETs 320N(T), 320N(C) will couple the respective bit line BL and source line SL to the output node 1210T and complement output node 1210C. Deactivation of the access and complement access NFETs 320N(T), 320N(C) will decouple the respective bit line BL and source line SL from the output node 1210T and complement output node 1210C. If a logic high voltage level (i.e., a '1') is stored at the output node 1210T, a logic low voltage level (i.e., '0') is stored at the complement output node 1210C. If a logic low voltage level (i.e., a '0') is stored at the output node 1210T, a logic high voltage level (i.e., '1') is stored at the complement output node 1210C. Activation of the word line WL with a low logic signal will cause the access and complement access NFETs 320N(T), 320N(C) to discharge the voltages on the output node 1210T and complement output node 1210C to the respective bit line BL and source line SL as PUF output data 1221T and complement PUF output data 1221C (that has a complementary logic state to PUF output data 1221T) of the PUF circuit 1200.

With continuing reference to FIG. 12, in a write operation to the PUF circuit 1200, the bit line BL and source line SL are charged with PUF write data 323T and complement PUF write data 323C (that has a complementary logic state to PUF write data 323T) to be written to the output or complement output nodes 1210T, 1210C. The write data charged on the bit line BL and source line SL have complementary logic values, unlike when a read operation is performed. Then, the word line signal 322 of an access-enable state (e.g., a higher voltage value) is asserted on a word line WL coupled to gates G of the access and complement access NFETs 320N(T), 320N(C). If a logic high voltage level (i.e., a '1') is stored at the output node 1210T, a logic low voltage level (i.e., '0') is stored at the complement output node 1210C. If a logic low voltage level (i.e., a '0') is stored at the output node 1210T, a logic high voltage level (i.e., '1') is stored at the complement output node 1210C. The word line signal 322 in an access-enable state on the word line WL to activate the access and complement access NFETs 320N(T), 320N(C) will cause the write data on the bit line BL and source line SL to pass through the access and complement access NFETs 320N(T), 320N(C) to the output or complement output nodes 1210T, 1210C as PUF write data.

In this example, eliminating the pull-up PFETs in the PUF circuit 1200 and coupling the MTJs 337T, 337C directly between their respective output and complement output nodes 1210T, 1210C and a common node, which is the read-enable node 1217 in this example, also supports a write-back operation after a PUF read operation. In this regard, as discussed in more detail below, the PUF circuit 1200 is designed so that after a PUF read operation is performed, where the PUF output data and complement PUF output data 1221T, 1221C are present on the output node 1210T and complement output node 1210C, the generated PUF output data and complement PUF output data 1221T, 1221C, as a result of the PUF read operation, is used in a write-back mode to cause a write current $I_W$ to flow from one MTJ 337T to its complement MTJ 337C to cause a memory state to be stored (i.e., written) in the programmable MTJs 337T, 337C. Storing a memory state in the MTJs 337T, 337C allows controlling of their resistances to reset the PUF circuit 400 for a subsequent read operation. Further, as an example shown in FIG. 12, the MTJs 337T, 337C can be reverse connected to each other with the pinned magnetization layer 342T of MTJ 337T coupled to the free magnetization layer 346C of MTJ 337C. This allows the same write current $I_W$ to program the MTJs 337T, 337C to the opposite memory state (e.g., P vs. AP) to further skew the PUF circuit 400 based on its inherent imbalance, thus causing the PUF circuit to stabilize the respective output and complement output nodes 1210T, 1210C faster on subsequent PUF read operations to the PUF circuit 1200. Alternatively, the MTJs 337T, 337C could be arranged where the pinned magnetization layer 342C of MTJ 337C is coupled to the free magnetization layer 346T of MTJ 337T. The PUF circuit 1200 in FIG. 12 can be provided as bit cells in a memory array, such as PUF memory array 502 in FIG. 5 and shown as PUF circuits 400(0)(0)-400(M)(N), to provide a PUF memory system.

The PUF circuit 1200 in FIG. 12 is also configured to be controlled in an enrollment operating mode in a first PUF operation performed in the PUF circuit 1200 (after a reset, for example) to generate PUF output data and complementary PUF output data 1221T, 1221C according to the skew of the PUF circuit 1200. This causes the PUF circuit 1200 to generate a random data output. However, as part of the enrollment operating mode, the PUF output data and complement PUF output data 1221T, 1221C generated by the PUF circuit 1200 can be written-back to the MTJs 337T, 337C to opposite memory states, as discussed above, to further improve the reproducibility and BER of the PUF circuit 1200 during subsequent read operations in a PUF read operating mode. In this regard, FIGS. 13A-13E discussed below are provided to illustrate current flow for various enrollment processes as part of enrollment operating modes of the PUF circuit 1200. FIGS. 14A-14E discussed below are signal diagrams illustrating exemplary signal levels of signals asserted to the PUF circuit 1200 in FIG. 12 to control the enrollment modes illustrated in FIGS. 13A-13E, respectively. FIGS. 13A-13E and 14A-14E will now be described.

Figures 13A, 14A:
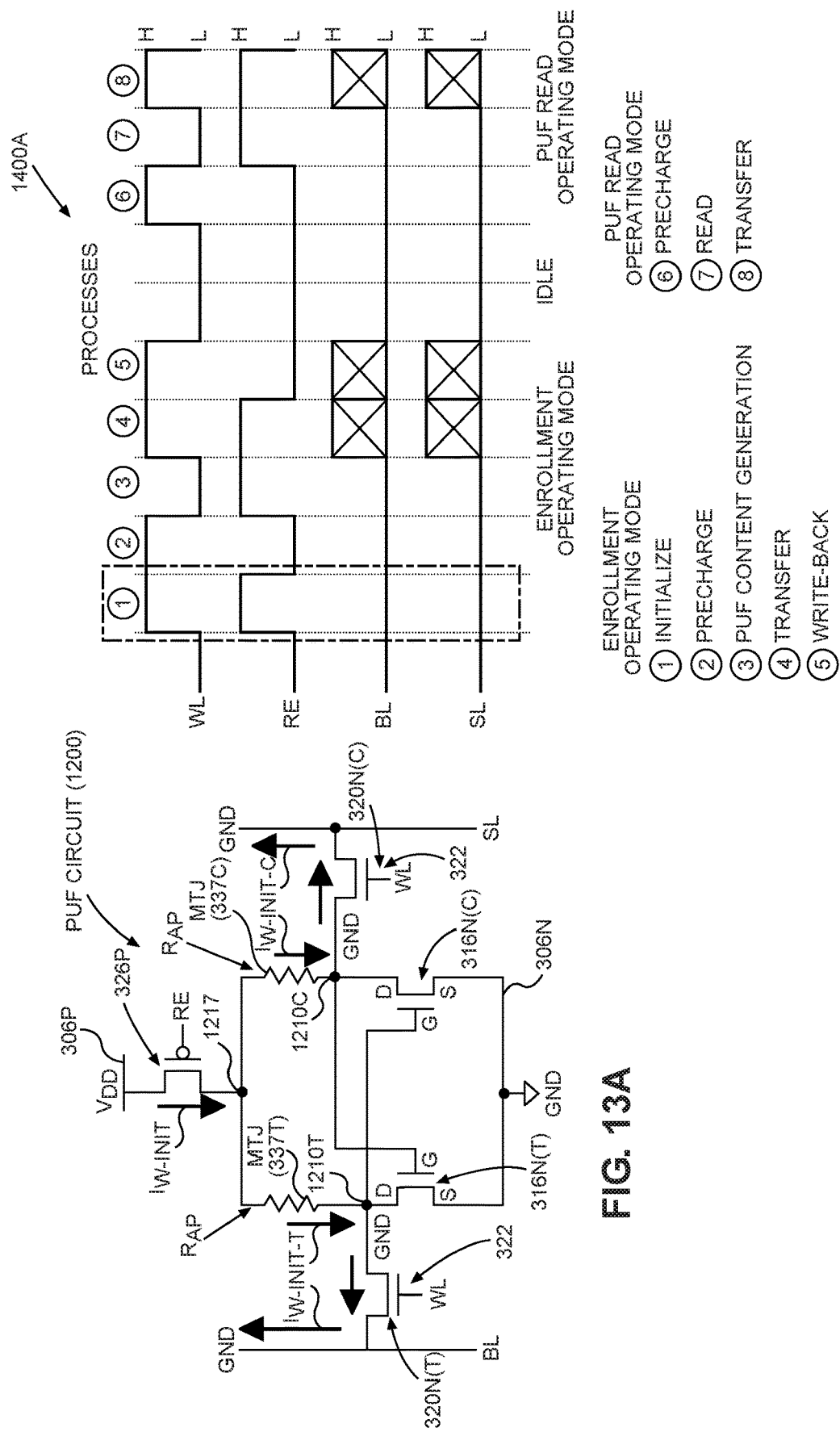

FIG. 13A illustrates current flow for an initialization process of an enrollment operating mode of the PUF circuit 1200 based on the signals asserted as shown in the signal diagram 1400A in FIG. 14A. The initialization process in this example is to initialize (i.e., write) the initial memory states of the MTJs 337T, 337C to the same memory state, which is the AP memory state $R_{AP}$ in this example. This initialization process is performed to reduce or eliminate the resistance skew between the MTJs 337T, 337C to achieve a random PUF response in a subsequent read operation. In this regard, a ground voltage GND is asserted on the source line SL and bit line BL, as shown in process 1 in FIG. 14A. A supply voltage $V_{DD}$ is applied to the positive voltage rail 306P, and the read-enable signal RE is asserted as a logic low 'L' or '0' signal indicating a read-enable state, as shown in process 1 in FIG. 14A, to activate the read-enable PFET 326P to turn on, as shown in FIG. 13A. To generate a respective write current $I_{W-INIT}$ to the respective output node 1210T and complement output node 1210C as shown in FIG. 13A, the word line signal 322 is asserted as a logic high 'H' or '1' signal (e.g., voltage $V_{DD}$) in an access-enable state, as shown in process 1 in FIG. 14A, to activate or turn on access NFET 320N(T) and complement access NFET 320N(C), as shown in FIG. 13A. As shown in FIG. 13A, the write current $I_{W-INIT}$ flows to the read-enable node 1217 and splits into a respective write current $I_{W-INIT-T}$ and a complement write current $I_{W-INIT-C}$ that flow through the respective MTJs 337C, 337T, discharging to the respective bit line BL and source line SL. The same memory state (e.g., an AP magnetization state) is written to both MTJs 337T, 337C because of their reverse connections, as previously discussed. The access and complement access NFETs 320N(T), 320N(C) are used in this example to pass a strong logic low signal (e.g., ground (GND)) to the bit line BL and the source line SL. Note, however, that PFET access transistors could also be employed.

FIG. 13B illustrates current flow for a pre-charge process of the enrollment operating mode of the PUF circuit 1200 based on the signals asserted as shown in the signal diagram 1400B in FIG. 14B. The pre-charge process is performed to set up the PUF circuit 1200 to generate an initial PUF response as the PUF output data and complement PUF output data 1221T, 1221C. In this regard, the read-enable signal RE is de-asserted as a logic high 'H' or '1' signal indicating a read-disable state, as shown in process 2 in FIG. 14B, to deactivate (i.e., turn-off) the read-enable PFET 326P, as shown in FIG. 13B. The word line signal 322 is continued to be asserted as a logic high 'H' or '1' signal (e.g., voltage $V_{DD}$) in an access-enable state, as shown in process 2 in FIG. 14B, to keep the access NFET 320N(T) and complement access NFET 320N(C) activated, as shown in FIG. 13B. This allows any pre-charge currents $I_{PRE-T}$, $I_{PRE-C}$ on output node 1210T and complement output node 1210C discharged to the bit line BL and the source line BL as a result of the initialization process shown in FIG. 13B to pre-charge the output node 1210T and complement output node 1210C to ground (GND) in this example.

FIG. 13C illustrates current flow for a PUF content generation process of the enrollment operating mode of the PUF circuit 1200 based on the signals asserted as shown in the signal diagram 1400C in FIG. 14C. The PUF content generation process is performed to cause the PUF circuit 1200 to generate the initial PUF response as the PUF output data and complement PUF output data 1221T, 1221C based on the pre-charging of the output node 1210T and complement output node 1210C in the pre-charging process illustrated in FIGS. 13B and 14B. In this regard, the read-enable signal RE is asserted as a logic low 'L' or '0' signal indicating a read-enable state, as shown in process 3 in FIG. 14C, to activate (i.e., turn-on) the read-enable PFET 326P, as shown in FIG. 13C. The word line signal 322 is de-asserted as a logic low 'L' or '0' signal in a word line disable state, as shown in process 3 in FIG. 14C, to deactivate the access NFET 320N(T) and complement access NFET 320N(C). This causes PUF content generation current $I_{GEN}$ to flow from the positive voltage rail 306P and split through the MTJs 337T, 337C and flow to the respective output and complement output nodes 1210T, 1210C. The difference in resistance of the MTJs 337T, 337C will cause different PUF content generation currents $I_{GEN-T}$, $I_{GEN-C}$ to flow through the respective MTJs 337T, 337C, thus causing one of the respective output and complement output nodes 1210T, 1210C to have less of a voltage drop, with the positive feedback forcing the respective output and complement output nodes 1210T, 1210C to opposite voltage states. For example, as shown FIG. 13C, if the resistance of MTJ 337T is greater than the resistance of MTJ 337C, then the voltage drop at complement output node 1210C will be lower than at output node 1210T. This keeps pull-down NFET 316N(T) turned on longer, causing output node 1210T to go to the on-resistance voltage of the voltage rail 306N, which is almost ground (GND) voltage or almost 0 V in this example. The complement output node 1210C goes to almost voltage $V_{DD}$ at the positive voltage rail 306P. Note that any variations in the resistances of the MTJs 337T, 337C affect the PUF response of the PUF circuit 1200 more than any variations in the threshold voltages of the pull-down and complement pull-down NFETs 316N(T), 316N(C), because the pull-down and complement pull-down NFETs 316N(T), 316N(C) are initially turned off.

FIG. 13D illustrates current flow for a transfer process of the enrollment operating mode of the PUF circuit 1200 based on the signals asserted as shown in the signal diagram 1400D in FIG. 14D. The transfer process is performed to cause the PUF circuit 1200 to transfer the generated PUF output data and complement PUF output data 1221T, 1221C resulting from the PUF content generation process in FIGS. 13C and 14C to the bit line BL and source line SL. In this regard, the read-enable signal RE is left asserted as a logic low 'L' or '0' signal indicating a read-enable state, as shown in process 4 in FIG. 14D. The word line signal 322 is asserted as a logic high 'H' or '1' signal in an access-enable state, as shown in process 4 in FIG. 14D, to activate the access NFET 320N(T) and complement access NFET 320N(C). This causes transfer currents $I_{TR-T}$, $I_{TR-C}$ to flow from the respective output and complement output nodes 1210T, 1210C to the respective bit line BL and source line SL to transfer the generated PUF output data and complement PUF output data 1221T, 1221C from the PUF circuit 1200.

Figures 13E, 14E:
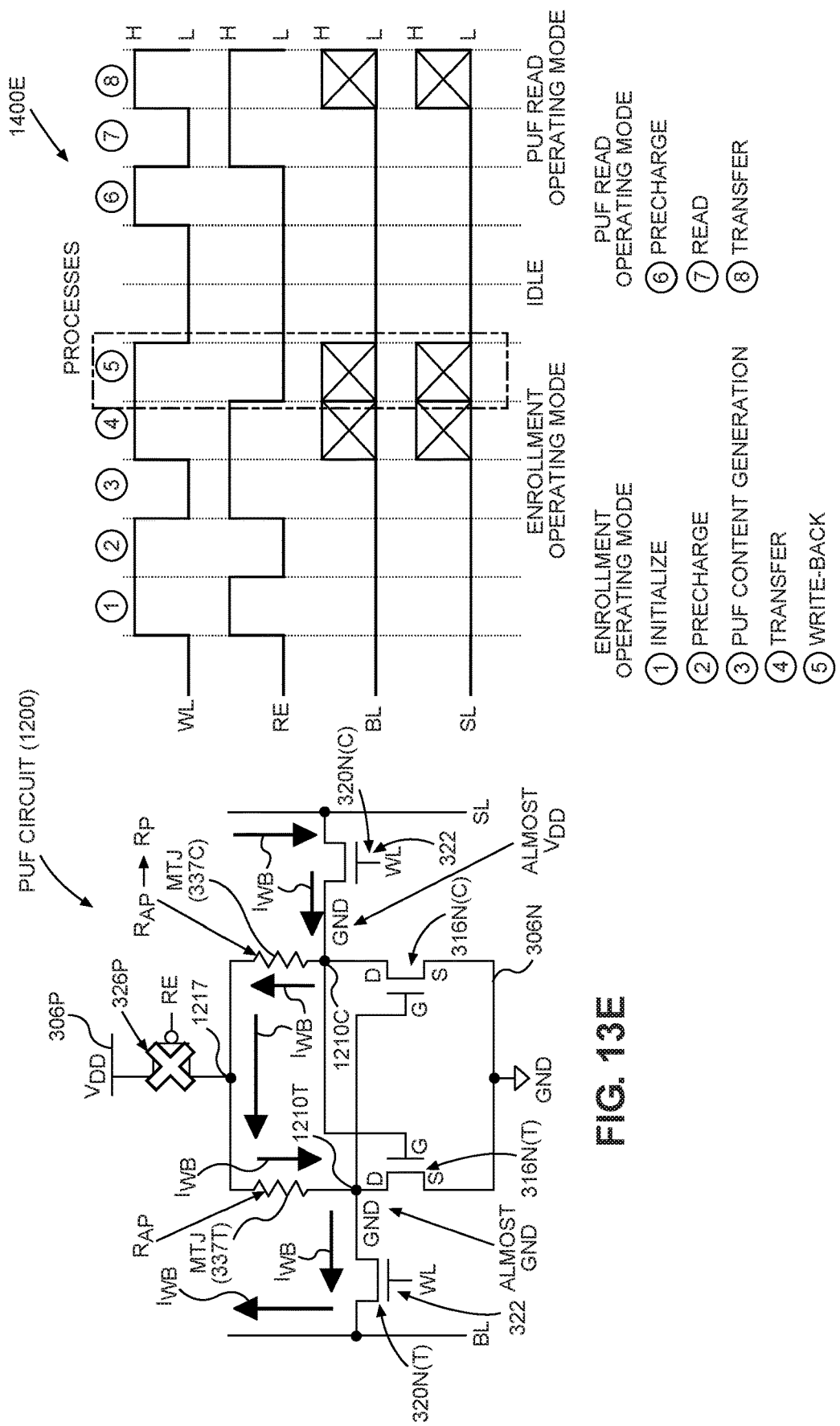

FIG. 13E illustrates current flow for a write-back process of the enrollment operating mode of the PUF circuit 1200 based on the signals asserted as shown in the signal diagram 1400E in FIG. 14E. The write-back process is performed to cause the PUF circuit 1200 to use the generated PUF output data and complement PUF output data 1221T, 1221C on the output node 1210T and complement output node 1210C to set the memory states of the MTJs 337T, 337C to opposite memory states as respective write-back and complement write-back memory states based on their reverse connection, as previously discussed, for improved reproducibility and BER. In this regard, the read-enable signal RE is de-asserted as a logic high 'H' or '1' signal indicating a read-disable state, as shown in process 5 in FIG. 14E, to deactivate (i.e., turn-off) the read-enable PFET 326P, as shown in FIG. 13E. The word line signal 322 is left asserted as a logic high 'H' or '1' signal in an access-enable state, as shown in process 5 in FIG. 14E, to leave the access and complement access NFETs 320N(T), 320N(C) to provide a current flow path between the bit line BL and source line SL through the complement output node 1210C, the MTJs 337C, 337T, and the output node 1210T. Because the PUF output data and complement PUF output data 321T, 321C in the form of voltages on the bit line BL and source line are in opposite voltage states, a write-back current $I_{WB}$ will flow from the source line SL or bit line BL at the higher voltage, to the bit line BL or source line SL at the lower voltage. In FIG. 13E, the write-back current $I_{WB}$ flows from the complement output node 1210C to the MTJ 337C and then from MTJ 337T to the output node 1210T since the PUF output data 1221T transferred to the source line SL in the transfer process in FIGS. 13D and 14D was a higher voltage than the PUF output data 1221T transferred to the bit line BL. Because the MTJs 337T, 337C are reverse connected, the same write-back current $I_{WB}$ flowing through the MTJs 337T, 337C causes the magnetization states to be opposite. In this example, the magnetization state of MTJ 337C is changed from an AP to a P magnetization state. As previously discussed, this further skews the PUF circuit 1200 for a new PUF read operation, causing the PUF circuit 1200 to stabilize the respective output and complement output nodes 1210T, 1210C faster on subsequent PUF read operations to the PUF circuit 1200.

Figures 15A, 16A:
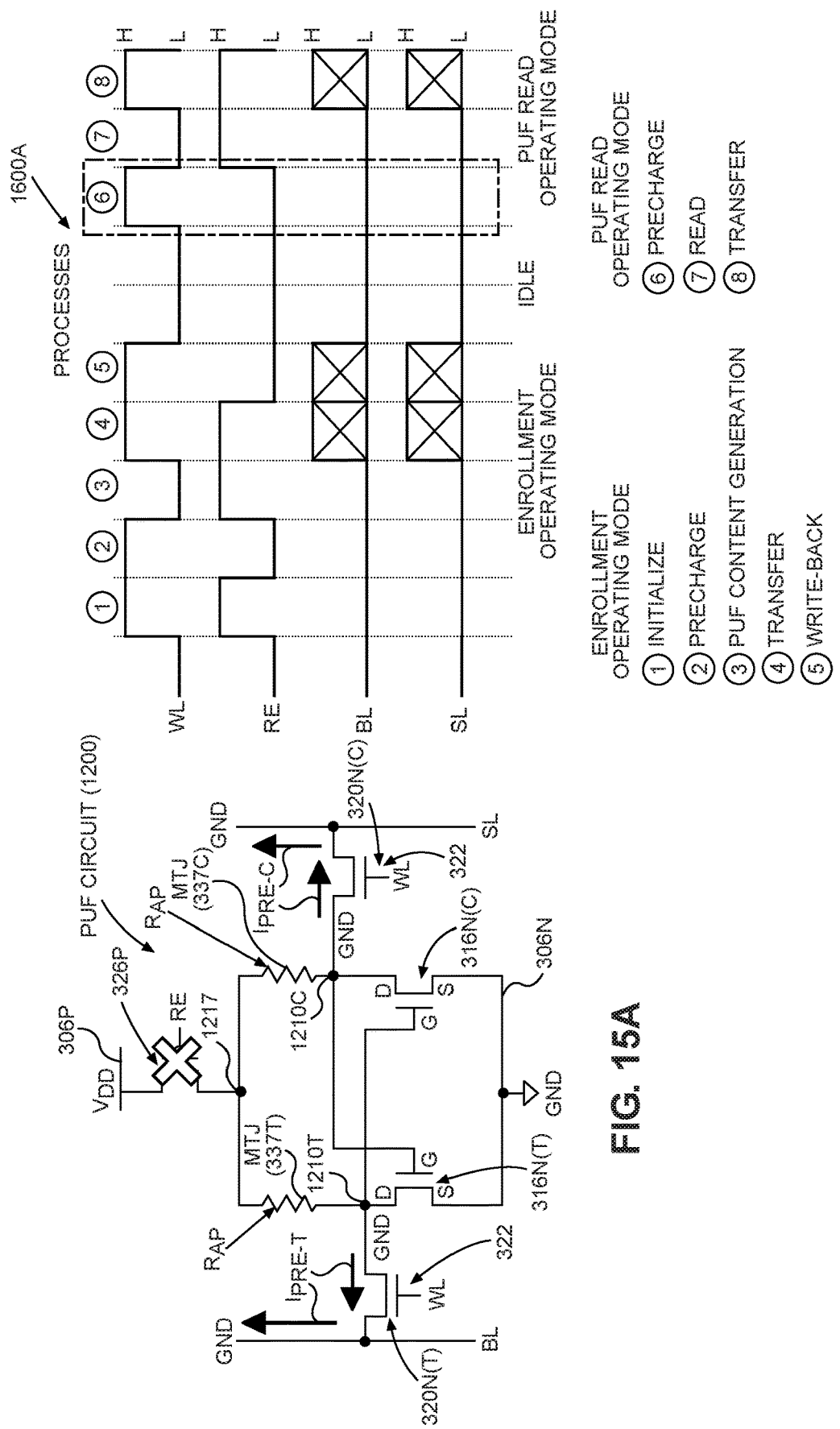
FIGS. 15A and 15B are diagrams illustrating current flows for exemplary PUF read processes for exemplary PUF read operation modes of the PUF circuit in FIG. 12.
FIGS. 16A and 16B are signal diagrams illustrating exemplary signal levels of signals asserted to the PUF circuit in FIG. 12 to control current flows for the exemplary PUF read processes for the exemplary PUF read operation modes illustrated in FIGS. 15A and 15B, respectively.
Figures 15B, 16B:
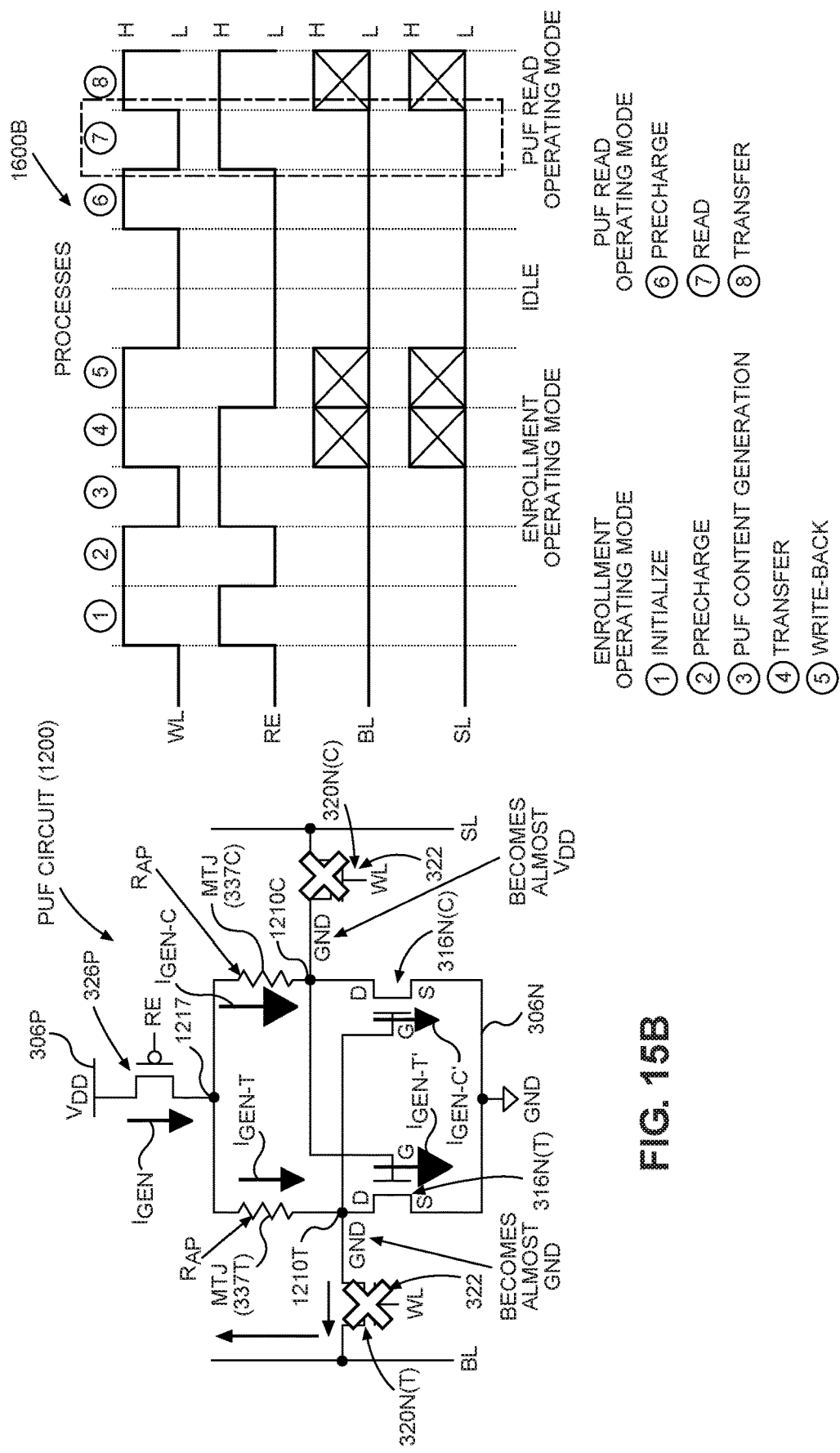

After the enrollment operating mode, the power source for the PUF circuit 1200 can be decoupled or turned off in an idle mode, as shown in FIG. 14E, until a PUF read operation is desired to be performed since the MTJs 337T, 337C are non-volatile memory devices. The PUF circuit 1200 in FIG. 12 is also configured to be controlled in a PUF read operating mode to generate the PUF output data and complementary PUF output data 1221T, 1221C according to the skew of the PUF circuit 400 and the stored memory states in the MTJs 337T, 337C. If the write-back enrollment process has already been performed, the memory states in the MTJs 337T, 337C will be opposite to each other as previously discussed. In this regard, FIGS. 15A and 15B discussed below are provided to illustrate current flow for various processes as part of PUF read operating modes of the PUF circuit 1200 to generate the PUF output data and complementary PUF output data 1221T, 1221C. FIGS. 16A and 16B discussed below are signal diagrams illustrating exemplary signal levels of signals asserted to the PUF circuit 1200 in FIG. 12 to control the PUF read operating modes illustrated in FIGS. 15A and 15B, respectively. Figure sets 15A and 15B, and 16A and 16B will now be described.

FIG. 15A illustrates current flow for a pre-charge process of a PUF read operating mode of the PUF circuit 1200 based on the signals asserted as shown in the signal diagram 1600A in FIG. 16A. The pre-charge process is performed to set up the PUF circuit 1200 to generate a PUF response as the PUF output data and complement PUF output data 1221T, 1221C. In this regard, the read-enable signal RE is de-asserted as a logic high 'H' or '1' signal indicating a read-disable state, as shown in process 1 in FIG. 16A, to deactivate (i.e., turn-off) the read-enable PFET 326P, as shown in FIG. 15A. The word line signal 322 is continued to be asserted as a logic high 'H' or '1' signal (e.g., voltage $V_{DD}$) in an access-enable state, as shown in process 1 in FIG. 16A, to keep the access NFET 320N(T) and complement access NFET 320N(C) activated, as shown in FIG. 16A. This allows any pre-charge currents $I_{PRE-T}$, $I_{PRE-C}$ on output node 1210T and complement output node 1210C discharged to the bit line BL and the source line SL as a result of the initialization process shown in FIG. 16A to pre-charge the output node 1210T and complement output node 1210C to ground (GND) in this example.

FIG. 15B illustrates current flow for a PUF read process of the PUF read operating mode of the PUF circuit 1200 based on the signals asserted as shown in the signal diagram 1600B in FIG. 16B. The PUF read process is performed to cause the PUF circuit 1200 to generate the PUF response as the PUF output data and complement PUF output data 1221T, 1221C based on the pre-charging of the output node 1210T and complement output node 1210C in the pre-charging process illustrated in FIGS. 15A and 16A. In this regard, FIG. 15B illustrates current flow for a PUF content generation process of the PUF read operating mode of the PUF circuit 1200 based on the signals asserted as shown in the signal diagram 1600B in FIG. 16B. The PUF read operation process is performed to cause the PUF circuit 1200 to generate the initial PUF response as the PUF output data and complement PUF output data 1221T, 1221C based on the pre-charging of the output node 1210T and complement output node 1210C in the pre-charging process illustrated in FIGS. 15A and 16A. In this regard, the read-enable signal RE is asserted as a logic low 'L' or '0' signal indicating a read-enable state, as shown in process 3 in FIG. 16B, to activate (i.e., turn-on) the read-enable PFET 326P, as shown in FIG. 15B. The word line signal 322 is de-asserted as a logic low 'L' or '0' signal in a word line disable state, as shown in process 3 in FIG. 16B, to deactivate the access NFET 320N(T) and complement access NFET 320N(C). This causes PUF content generation current $I_{GEN}$ to flow from the positive voltage rail 306P and split through the MTJs 337T, 337C and flow to the respective output and complement output nodes 1210T, 1210C. The difference in resistances of the MTJs 337T, 337C will cause different PUF content generation currents $I_{GEN-T}$, $I_{GEN-C}$ to flow through the respective MTJs 337T, 337C, thus causing one of the respective output and complement output nodes 1210T, 1210C to have less of a voltage drop, with the positive feedback forcing the respective output and complement output nodes 1210T, 1210C to opposite voltage states. For example, as shown in FIG. 15B, if the resistance of MTJ 337T is greater than the resistance of MTJ 337C, then the voltage drop at complement output node 1210C will be lower than at output node 1210T, thus keeping pull-down NFET 316N(T) turned on longer and causing output node 1210T to go to almost ground (GND) at voltage rail 306N and complement output node 1210C to go to almost voltage $V_{DD}$ at the positive voltage rail 306P. Note that any variations in the resistances of the MTJs 337T, 337C affect the PUF response of the PUF circuit 1200 more than any variations in the threshold voltages of the pull-down and complement pull-down NFETs 316N(T), 316N(C), because the pull-down and complement pull-down NFETs 316N(T), 316N(C) are initially turned off.

After the PUF read processes of the PUF read operating mode of the PUF circuit 1200 illustrated in FIGS. 15B and 16B, the PUF output data and complement PUF output data 1221T, 1221C can be transferred to the source line SL and bit line BL according to the same transfer processes in the PUF enrollment operating mode in FIGS. 13D and 14D previously discussed.

A PUF circuit in the form of an SRAM bit cell with complement passive NV resistance elements in place of respective complementary, cross-coupled FETs to enhance imbalance between the cross-coupled FETs and reduce or eliminate transistor noise as a result of changes in temperature, voltage variations, and aging effect that would otherwise occur if the replaced FETs were present, may be provided in or integrated into any processor-based device. Examples of such PUF circuits include, but are not limited to the PUF circuits 400, 1200 in FIGS. 4 and 12, respectively. Examples of PUF memory systems that can include such PUF circuits include, but are not limited to the PUF memory system 500 in FIG. 5. Examples of processor-based devices include, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 17:
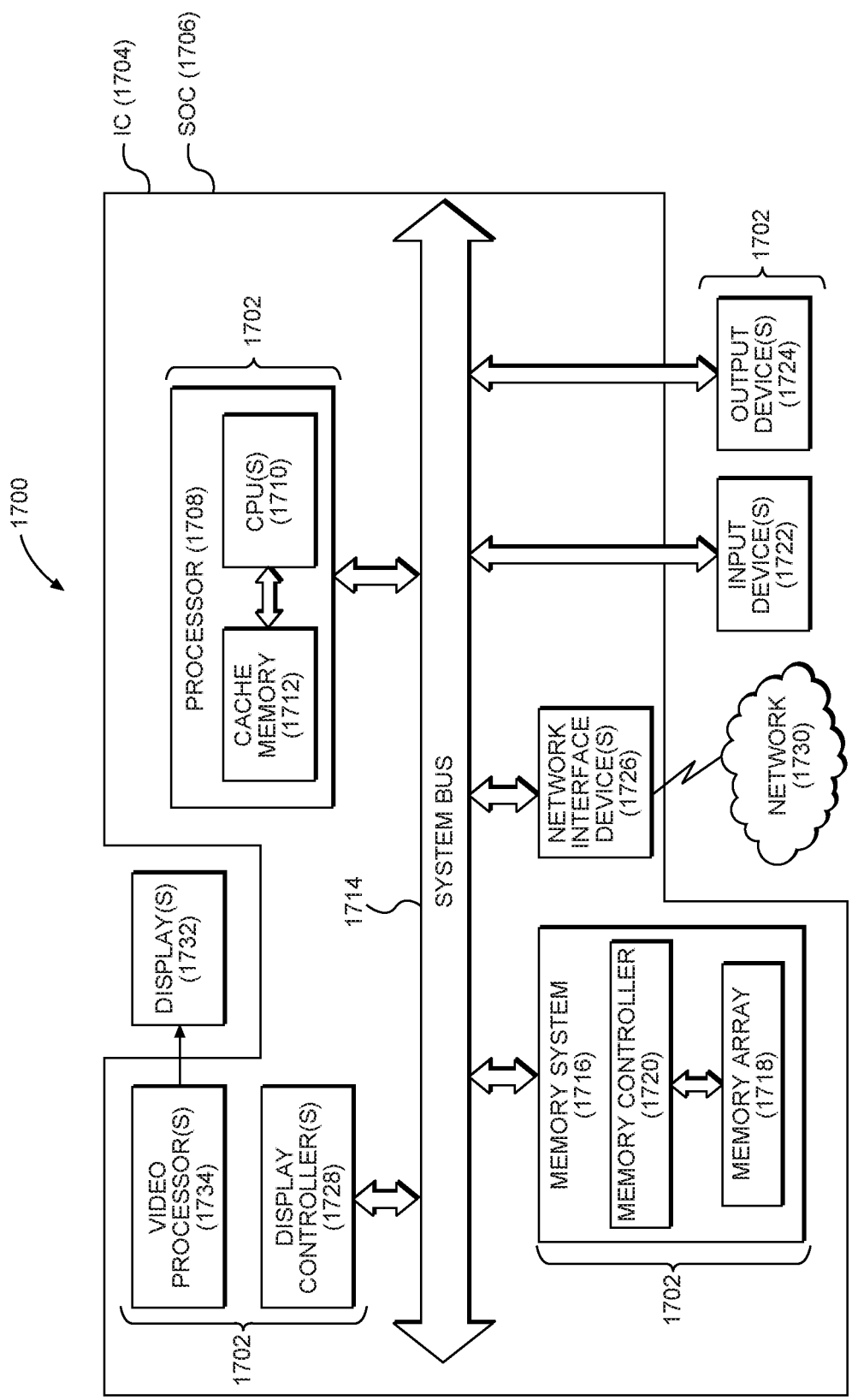
FIG. 17 is a block diagram of an exemplary processor-based system that can include a PUF memory system, including but not limited to the PUF memory system in FIG. 5 that can include a PUF circuit, including but not limited to the PUF circuits in FIGS. 4 and 12, with passive NV resistance elements in place of respective cross-coupled FETs and coupled to respective complementary PUF output nodes, to enhance imbalance in the PUF circuit and reduce or eliminate transistor noise as a result of changes in temperature, voltage variations, and aging effect that would otherwise occur if the replaced FETs were present in the PUF circuits.

In this regard, FIG. 17 illustrates an example of a processor-based system 1700 that can include a PUF circuit 1702 in the form of an SRAM bit cell with complement passive NV resistance elements in place of respective complementary, cross-coupled FETs. This enhances imbalance between the cross-coupled FETs and reduces or eliminates transistor noise as a result of changes in temperature, voltage variations, and aging effect that would otherwise occur if the replaced FETs were present, such as, without limitation, the PUF circuits 400, 1200 in FIGS. 4 and 12, respectively.

In this example, the processor-based system 1700 is provided in an IC 1704. The IC 1704 may be included in or provided to a system-on-a-chip (SoC) 1706. The processor-based system 1700 includes a processor 1708 that includes one or more CPUs 1710. The processor 1708 may include a cache memory 1712 coupled to the CPU(s) 1710 for rapid access to temporarily stored data. The cache memory 1712 may include a PUF circuit 1702 in the form of an SRAM bit cell with complement passive NV resistance elements in place of respective complementary, cross-coupled FETs to enhance imbalance between the cross-coupled FETs and reduce or eliminate transistor noise as a result of changes in temperature, voltage variations, and aging effect that would otherwise occur if the replaced FETs were present, such as, without limitation, the PUF circuits 400, 1200 in FIGS. 4 and 12, respectively. The processor 1708 is coupled to a system bus 1714 and can intercouple master and slave devices included in the processor-based system 1700. As is well known, the processor 1708 communicates with these other devices by exchanging address, control, and data information over the system bus 1714. Although not illustrated in FIG. 17, multiple system buses 1714 could be provided, wherein each system bus 1714 constitutes a different fabric. For example, the processor 1708 can communicate bus transaction requests to a memory system 1716 as an example of a slave device. The memory system 1716 may include a memory array 1718 whose access is controlled by a memory controller 1720. The memory system 1716 may be or include a PUF circuit 1702 in the form of an SRAM bit cell with complement passive NV resistance elements in place of respective complementary, cross-coupled FETs to enhance imbalance between cross-coupled FETs and reduce or eliminate transistor noise as a result of changes in temperature, voltage variations, and aging effect that would otherwise occur if the replaced FETs were present, such as, without limitation, the PUF circuits 400, 1200 in FIGS. 4 and 12, respectively.

Other master and slave devices can be connected to the system bus 1714. As illustrated in FIG. 17, these devices can include the memory system 1716, and one or more input devices 1722, which can include a PUF circuit 1702 in the form of an SRAM bit cell with complement passive NV resistance elements in place of respective complementary, cross-coupled FETs to enhance imbalance between the cross-coupled FETs and reduce or eliminate transistor noise as a result of changes in temperature, voltage variations, and aging effect that would otherwise occur if the replaced FETs were present, such as, without limitation, the PUF circuits 400, 1200 in FIGS. 4 and 12, respectively. The input device(s) 1722 can include any type of input device, including but not limited to input keys, switches, voice processors, etc. The other devices can also include one or more output devices 1724, and one or more network interface devices 1726, both of which can include a PUF circuit 1702 in the form of an SRAM bit cell with complement passive NV resistance elements in place of respective complementary, cross-coupled FETs to enhance imbalance between the cross-coupled FETs and reduce or eliminate transistor noise as a result of changes in temperature, voltage variations, and aging effect that would otherwise occur if the replaced FETs were present, such as, without limitation, the PUF circuits 400, 1200 in FIGS. 4 and 12, respectively. The output device(s) 1724 can include any type of output device, including but not limited to audio, video, other visual indicators, etc. The other devices can also include one or more display controllers 1728 as examples. The network interface device(s) 1726 can be any devices configured to allow exchange of data to and from a network 1730. The network 1730 can be any type of network, including but not limited to a wired or wireless network, a private or public network, a local area network (LAN), a wireless local area network (WLAN), a wide area network (WAN), a BLUETOOTH™ network, and the Internet. The network interface device(s) 1726 can be configured to support any type of communications protocol desired.

The processor 1708 may also be configured to access the display controller(s) 1728 over the system bus 1714 to control information sent to one or more displays 1732. The display controller(s) 1728 sends information to the display(s) 1732 to be displayed via one or more video processors 1734, which process the information to be displayed into a format suitable for the display(s) 1732. The display controller(s) 1728 and the video processor(s) 1734 can include a PUF circuit 1702 in the form of an SRAM bit cell with complement passive NV resistance elements in place of respective complementary, cross-coupled FETs to enhance imbalance between the cross-coupled FETs and reduce or eliminate transistor noise as a result of changes in temperature, voltage variations, and aging effect that would otherwise occur if the replaced FETs were present, such as, without limitation, the PUF circuits 400, 1200 in FIGS. 4 and 12, respectively. The display(s) 1732 can include any type of display, including but not limited to a cathode ray tube (CRT), a liquid crystal display (LCD), a plasma display, etc.

Figure 18:
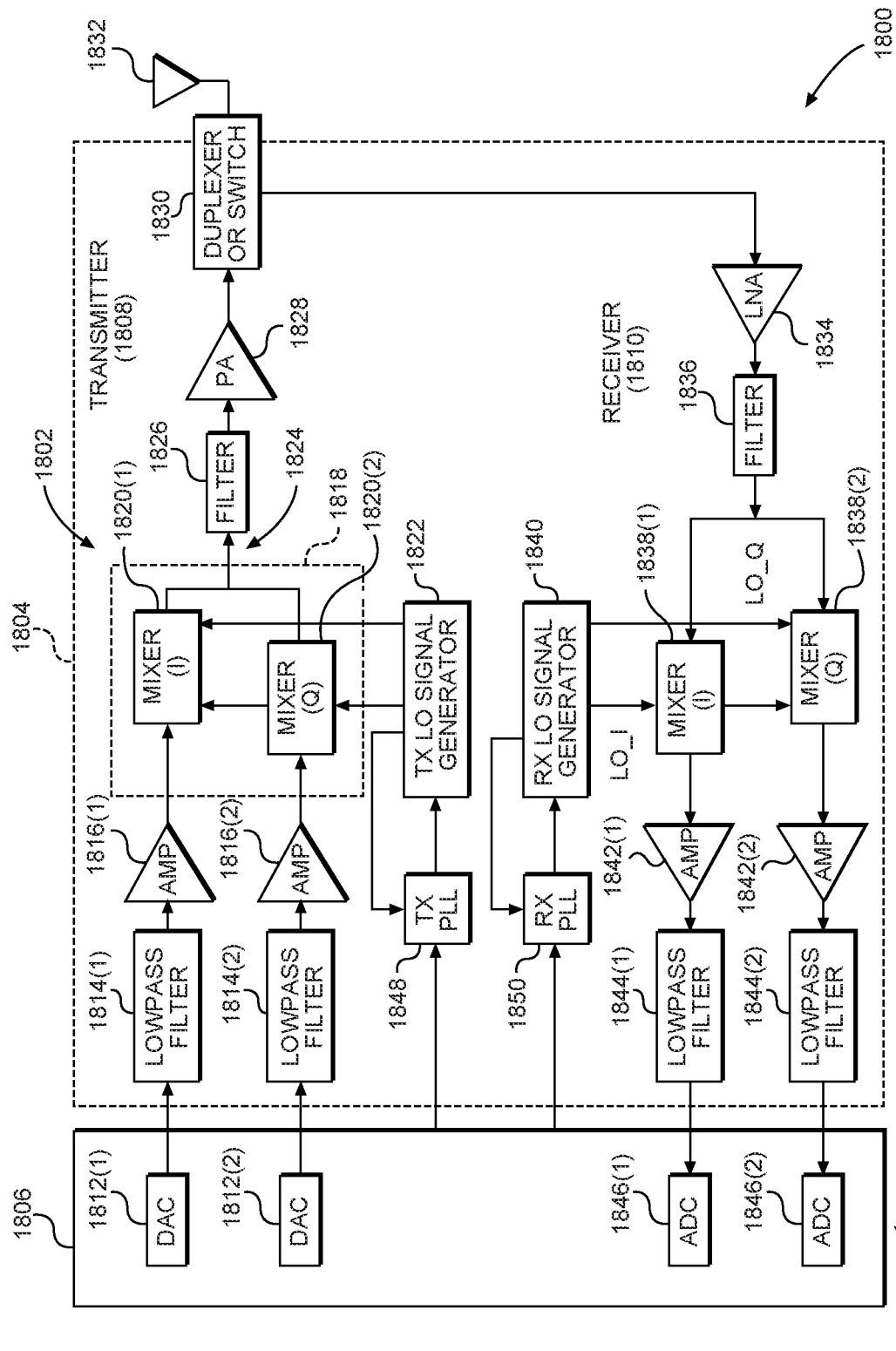
FIG. 18 is a block diagram of an exemplary wireless communications device that includes radio frequency (RF) components formed in an integrated circuit (IC), wherein any of the components therein can include PUF circuits or a PUF memory array that includes PUF circuits, including but not limited to the PUF circuits in FIGS. 4 and 12, with passive NV resistance elements in place of respective cross-coupled FETs and coupled to respective complementary PUF output nodes, to enhance imbalance in the PUF circuit and reduce or eliminate transistor noise as a result of changes in temperature, voltage variations, and aging effect that would otherwise occur if the replaced FETs were present in the PUF circuits.

FIG. 18 illustrates an exemplary wireless communications device 1800 that includes radio frequency (RF) components formed in an IC 1802, wherein any of the components therein can include a PUF circuit 1803 in the form of an SRAM bit cell with complement passive NV resistance elements in place of respective complementary, cross-coupled FETs to enhance imbalance between the cross-coupled FETs and reduce or eliminate transistor noise as a result of changes in temperature, voltage variations, and aging effect that would otherwise occur if the replaced FETs were present, such as, without limitation, the PUF the PUF circuits 400, 1200 in FIGS. 4 and 12, respectively.

In this regard, the wireless communications device 1800 may be provided in the IC 1802. The wireless communications device 1800 may include or be provided in any of the above referenced devices, as examples. As shown in FIG. 18, the wireless communications device 1800 includes a transceiver 1804 and a data processor 1806. The data processor 1806 may include a memory to store data and program codes. The transceiver 1804 includes a transmitter 1808 and a receiver 1810 that support bi-directional communications. In general, the wireless communications device 1800 may include any number of transmitters 1808 and/or receivers 1810 for any number of communication systems and frequency bands. All or a portion of the transceiver 1804 may be implemented on one or more analog ICs, RF ICs (RFICs), mixed-signal ICs, etc.

The transmitter 1808 or the receiver 1810 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 1810. In the direct-conversion architecture, a signal is frequency-converted between RF and baseband in one stage. The super-heterodyne and direct-conversion architectures may use different circuit blocks and/or have different requirements. In the wireless communications device 1800 in FIG. 18, the transmitter 1808 and the receiver 1810 are implemented with the direct-conversion architecture.

In the transmit path, the data processor 1806 processes data to be transmitted and provides I and Q analog output signals to the transmitter 1808. In the exemplary wireless communications device 1800, the data processor 1806 includes digital-to-analog converters (DACs) 1812(1), 1812(2) for converting digital signals generated by the data processor 1806 into the I and Q analog output signals, e.g., I and Q output currents, for further processing.

Within the transmitter 1808, lowpass filters 1814(1), 1814(2) filter the I and Q analog output signals, respectively, to remove undesired signals caused by the prior digital-to-analog conversion. Amplifiers (AMP) 1816(1), 1816(2) amplify the signals from the lowpass filters 1814(1), 1814(2), respectively, and provide I and Q baseband signals. An upconverter 1818 upconverts the I and Q baseband signals with I and Q transmit (TX) local oscillator (LO) signals through mixers 1820(1), 1820(2) from a TX LO signal generator 1822 to provide an upconverted signal 1824. A filter 1826 filters the upconverted signal 1824 to remove undesired signals caused by the frequency upconversion as well as noise in a receive frequency band. A power amplifier (PA) 1828 amplifies the upconverted signal 1824 from the filter 1826 to obtain the desired output power level and provides a transmit RF signal. The transmit RF signal is routed through a duplexer or switch 1830 and transmitted via an antenna 1832.

In the receive path, the antenna 1832 receives signals transmitted by base stations and provides a received RF signal, which is routed through the duplexer or switch 1830 and provided to a low noise amplifier (LNA) 1834. The duplexer or switch 1830 is designed to operate with a specific receive (RX)-to-TX duplexer frequency separation, such that RX signals are isolated from TX signals. The received RF signal is amplified by the LNA 1834 and filtered by a filter 1836 to obtain a desired RF input signal. Down-conversion mixers 1838(1), 1838(2) mix the output of the filter 1836 with I and Q RX LO signals (i.e., LO_I and LO_Q) from an RX LO signal generator 1840 to generate I and Q baseband signals. The I and Q baseband signals are amplified by amplifiers (AMP) 1842(1), 1842(2) and further filtered by lowpass filters 1844(1), 1844(2) to obtain I and Q analog input signals, which are provided to the data processor 1806. In this example, the data processor 1806 includes ADCs 1846(1), 1846(2) for converting the analog input signals into digital signals to be further processed by the data processor 1806.

In the wireless communications device 1800 of FIG. 18, the TX LO signal generator 1822 generates the I and Q TX LO signals used for frequency upconversion, while the RX LO signal generator 1840 generates the I and Q RX LO signals used for frequency downconversion. Each LO signal is a periodic signal with a particular fundamental frequency. A TX phase-locked loop (PLL) circuit 1848 receives timing information from the data processor 1806 and generates a control signal used to adjust the frequency and/or phase of the TX LO signals from the TX LO signal generator 1822. Similarly, an RX PLL circuit 1850 receives timing information from the data processor 1806 and generates a control signal used to adjust the frequency and/or phase of the RX LO signals from the RX LO signal generator 1840.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A physically unclonable function (PUF) circuit, comprising:
a storage circuit comprising a single field-effect transistor (FET), the storage circuit comprising:
an input node;
an output node; and
the single FET coupled to the input node, the output node, and a voltage rail;
a complement storage circuit comprising a single complement FET, the complement storage circuit comprising:
a complement input node coupled to the output node of the storage circuit;
a complement output node coupled to the input node of the storage circuit; and
the single complement FET coupled to the complement input node, the complement output node, and the voltage rail;
a passive non-volatile (NV) resistance element having a resistance, the passive NV resistance element coupled directly to the single FET; and
a complement passive NV resistance element having a complement resistance, the complement passive NV resistance element coupled directly to the single complement FET and directly to the passive NV resistance element.

2. The PUF circuit of claim 1, wherein:
the storage circuit does not comprise another FET in addition to the single FET; and
the complement storage circuit does not comprise another FET in addition to the single complement FET.

3. The PUF circuit of claim 1, further comprising a read-enable node, wherein:
the passive NV resistance element is coupled to the read-enable node; and
the complement passive NV resistance element is coupled to the read-enable node.

4. The PUF circuit of claim 3, further comprising a read-enable control circuit coupled to the read-enable node and a second voltage rail, the read-enable control circuit configured to couple the read-enable node to the second voltage rail in response to a read-enable signal indicating a read-enable state.

5. The PUF circuit of claim 3, wherein:
the passive NV resistance element comprises a magnetic tunnel junction (MTJ) comprising a free magnetization layer, a pinned magnetization layer, and a tunnel junction between the free magnetization layer and the pinned magnetization layer; and
the complement passive NV resistance element comprises a complement MTJ comprising a complement free magnetization layer, a complement pinned magnetization layer, and a complement tunnel junction between the complement free magnetization layer and the complement pinned magnetization layer.

6. The PUF circuit of claim 5, wherein the free magnetization layer of the MTJ is coupled to the read-enable node and the complement pinned magnetization layer of the complement MTJ.

7. The PUF circuit of claim 5, wherein the pinned magnetization layer of the MTJ is coupled to the read-enable node and the complement free magnetization layer of the complement MTJ.

8. The PUF circuit of claim 1, wherein:
the single FET comprises a P-type FET (PFET) coupled to the voltage rail comprising a positive voltage rail; and
the single complement FET comprises a complement PFET coupled to the positive voltage rail.

9. The PUF circuit of claim 8, further comprising:
a read-enable node; and
a read-enable control circuit coupled to the read-enable node and a ground rail, the read-enable control circuit comprising a read-enable control input; and
wherein:
the passive NV resistance element is coupled to the read-enable node;
the complement passive NV resistance element is coupled to the read-enable node; and
the read-enable control circuit is configured to couple the ground rail to the read-enable node in response to a read-enable signal on the read-enable control input indicating a read-enable state.

10. The PUF circuit of claim 9, wherein:
the passive NV resistance element is directly coupled to the output node and the read-enable control circuit; and
the complement passive NV resistance element is directly coupled to the complement output node and the read-enable control circuit.

11. The PUF circuit of claim 1, wherein:
the single FET comprises an N-type FET (NFET) coupled to the voltage rail comprising a ground rail; and
the single complement FET comprises a complement NFET coupled to the ground rail.

12. The PUF circuit of claim 11, further comprising:
a read-enable node; and
a read-enable control circuit coupled to the read-enable node and a positive voltage rail, the read-enable control circuit comprising a read-enable control input; and
wherein:
the passive NV resistance element is coupled to the read-enable node;
the complement passive NV resistance element is coupled to the read-enable node; and
the read-enable control circuit is configured to couple the positive voltage rail to the read-enable node in response to a read-enable signal on the read-enable control input indicating a read-enable state.

13. The PUF circuit of claim 12, wherein:
the passive NV resistance element is directly coupled to the output node and the read-enable control circuit; and
the complement passive NV resistance element is directly coupled to the complement output node and the read-enable control circuit.

14. The PUF circuit of claim 1, wherein:
the passive NV resistance element comprises a magnetic tunnel junction (MTJ) comprising a free magnetization layer, a pinned magnetization layer, and a tunnel junction between the free magnetization layer and the pinned magnetization layer; and
the complement passive NV resistance element comprises a complement MTJ comprising a complement free magnetization layer, a complement pinned magnetization layer, and a complement tunnel junction between the complement free magnetization layer and the complement pinned magnetization layer.

15. The PUF circuit of claim 1, further comprising:
an access circuit coupled to the output node;
a complement access circuit coupled to the complement output node;
the access circuit comprising an access transistor comprising a gate coupled to a word line, a first electrode coupled to a bit line, and a second electrode coupled to the output node, the access transistor configured to:
couple the bit line to the output node in response to a word line signal on the word line indicating an access enable state; and
decouple the bit line from the output node in response to the word line signal on the word line indicating an access disable state; and
the complement access circuit comprising a complement access transistor comprising a gate coupled to a word line, a first electrode coupled to a source line, and a second electrode coupled to the complement output node, the complement access transistor configured to:
couple the source line to the complement output node in response to a word line signal on the word line indicating an access enable state; and
decouple the source line from the complement output node in response to the word line signal on the word line indicating an access disable state.

16. The PUF circuit of claim 1 integrated into an integrated circuit (IC).

17. The PUF circuit of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

18. A method of generating a physically unclonable function (PUF) data output from a PUF circuit, comprising:
charging a bit line with a voltage based on a voltage on a voltage rail;
charging a source line with the voltage based on the voltage on the voltage rail;
in response to a word line signal indicating an access-enable state;
coupling the bit line to an output node of a storage circuit of a PUF circuit, the PUF circuit comprising:
the storage circuit comprising a single field-effect transistor (FET), the storage circuit comprising:
an input node;
the output node; and
the single FET coupled to the input node, the output node, and the voltage rail; and
a complement storage circuit comprising a single complement FET, the complement storage circuit comprising:
a complement input node coupled to the output node of the storage circuit;
a complement output node coupled to the input node of the storage circuit; and
the single complement FET coupled to the complement input node, the complement output node, and the voltage rail;
a passive NV resistance element having a resistance, the passive NV resistance element coupled directly to the single FET; and
a complement passive NV resistance element having a complement resistance, the complement passive NV resistance element coupled directly to the single complement FET and directly to the passive NV resistance element; and
coupling the source line to the complement output node of the complement storage circuit; and
in response to the word line signal indicating an access-disable state:
decoupling the bit line from the input node of the storage circuit;
decoupling the source line from the complement input node of the complement storage circuit;
generating a PUF output data indicating a memory state of the storage circuit and the complement storage circuit on the output node; and
generating a complement PUF output data on the complement output node indicating a complement memory state complementary to the memory state.

19. The method of claim 18, wherein the passive NV resistance element comprises a magnetic tunnel junction (MTJ), and the complement passive NV resistance element comprises a complement MTJ; and
further comprising:
charging the bit line with a write voltage;
charging the source line with the write voltage;
coupling the passive NV resistance element and the complement passive NV resistance element to a ground rail;
coupling the bit line to the output node of the storage circuit of the PUF circuit to allow a write current based on the write voltage to flow from the bit line to the passive NV resistance element to write an initial memory state to the passive NV resistance element; and
coupling the source line to the complement output node of the complement storage circuit to allow a complement write current based on the write voltage to flow from the source line to the complement passive NV resistance element to write the initial memory state to the complement passive NV resistance element.

20. The method of claim 19, further comprising:
decoupling the passive NV resistance element and the complement passive NV resistance element from the ground rail;
charging the bit line with a voltage; and
charging the source line with the voltage.

21. The method of claim 20, further comprising:
decoupling the bit line from the output node of the storage circuit of the PUF circuit;
decoupling the source line from the complement output node of the complement storage circuit; and
coupling the passive NV resistance element and the complement passive NV resistance element to the ground rail to generate the PUF output data on the output node and the complement PUF output data on the complement output node based on the difference in resistance between the passive NV resistance element and the complement passive NV resistance element.

22. The method of claim 21, further comprising:
coupling the bit line to the output node of the storage circuit of the PUF circuit to transfer the PUF output data from the output node to the bit line; and
decoupling the source line from the complement output node of the complement storage circuit to transfer the complement PUF output data from the complement output node to the source line.

23. The method of claim 22, further comprising decoupling the passive NV resistance element and the complement passive NV resistance element from the ground rail to generate a second write current based on the PUF output data to flow from the bit line to the passive NV resistance element and the complement passive NV resistance element to write a write-back memory state to the passive NV resistance element and a complement write-back memory state complementary to the write-back memory state to the complement passive NV resistance element.

24. The method of claim 23, wherein:
the MTJ comprises a free magnetization layer, a pinned magnetization layer, and a tunnel junction between the free magnetization layer and the pinned magnetization layer;
the complement MTJ comprises a complement free magnetization layer, a complement pinned magnetization layer, and a complement tunnel junction between the complement free magnetization layer and the complement pinned magnetization layer; and
the free magnetization layer of the MTJ is coupled to the complement pinned magnetization layer of the complement MTJ.

25. The method of claim 23, wherein:
the MTJ comprises a free magnetization layer, a pinned magnetization layer, and a tunnel junction between the free magnetization layer and the pinned magnetization layer;
the complement MTJ comprises a complement free magnetization layer, a complement pinned magnetization layer, and a complement tunnel junction between the complement free magnetization layer and the complement pinned magnetization layer; and
the pinned magnetization layer of the MTJ is coupled to the complement free magnetization layer of the complement MTJ.

26. A physically unclonable function (PUF) memory system, comprising:
a PUF memory array, comprising:
a plurality of memory bit cell row circuits each comprising a plurality of PUF circuits each comprising:
a storage circuit comprising a single field-effect transistor (FET), the storage circuit comprising:
an input node;
an output node; and
the single FET coupled to the input node, the output node, and a voltage rail;
a complement storage circuit comprising a single complement FET, the complement storage circuit comprising:
a complement input node coupled to the output node of the storage circuit;
a complement output node coupled to the input node of the storage circuit; and
the single complement FET coupled to the complement input node, the complement output node, and the voltage rail;
a passive NV resistance element having a resistance, the passive NV resistance element coupled directly to the single FET; and
a complement passive NV resistance element having a complement resistance, the complement passive NV resistance element coupled directly to the single complement FET and directly to the passive NV resistance element; and
a plurality of PUF bit cell column circuits each comprising a PUF circuit among the plurality of PUF circuits from a memory bit cell row circuit among the plurality of memory bit cell row circuits; and
a PUF output coupled to the PUF memory array;
the PUF memory array configured to generate a data output on the PUF output based on a memory state in at least one PUF circuit among the plurality of PUF circuits accessed in a PUF read operation to the PUF memory array.

27. The PUF memory system of claim 26, further comprising:
a positive voltage rail configured to receive a positive supply voltage, the positive voltage rail coupled to each of the plurality of PUF circuits in the PUF memory array;
a ground voltage rail coupled to each of the plurality of PUF circuits in the PUF memory array;
a plurality of word lines, each word line among the plurality of word lines coupled to a memory bit cell row circuit among the plurality of memory bit cell row circuits each comprising the plurality of PUF circuits;
a plurality of bit lines, each bit line among the plurality of bit lines coupled to a respective PUF bit cell column circuit among the plurality of PUF bit cell column circuits; and
a plurality of source lines, each source line among the plurality of source lines coupled to a respective PUF bit cell column circuit among the plurality of PUF bit cell column circuits.

28. The PUF memory system of claim 26, wherein for each PUF circuit among the plurality of PUF circuits:
the storage circuit does not comprise another FET in addition to the single FET; and
the complement storage circuit does not comprise another FET in addition to the single complement FET.

29. The PUF memory system of claim 26, wherein for each PUF circuit among the plurality of PUF circuits:
the passive NV resistance element comprises a magnetic tunnel junction (MTJ) comprising a free magnetization layer, a pinned magnetization layer, and a tunnel junction between the free magnetization layer and the pinned magnetization layer; and
the complement passive NV resistance element comprises a complement MTJ comprising a complement free magnetization layer, a complement pinned magnetization layer, and a complement tunnel junction between the complement free magnetization layer and the complement pinned magnetization layer.

30. The PUF memory system of claim 29, wherein for each PUF circuit among the plurality of PUF circuits, the free magnetization layer of the MTJ is coupled to a read-enable node and the complement pinned magnetization layer of the complement MTJ.

31. The PUF memory system of claim 29, wherein for each PUF circuit among the plurality of PUF circuits, the pinned magnetization layer of the MTJ is coupled to a read-enable node and the complement free magnetization layer of the complement MTJ.

32. The PUF memory system of claim 26, wherein each PUF circuit among the plurality of PUF circuit further comprises:
- an access circuit coupled to the output node; and
- a complement access circuit coupled to the complement output node;
- the access circuit comprising an access transistor comprising a gate coupled to a word line, a first electrode coupled to a bit line, and a second electrode coupled to the output node, the access transistor configured to:
  - couple the bit line to the output node in response to a word line signal on the word line indicating an access enable state; and
  - decouple the bit line from the output node in response to the word line signal on the word line indicating an access disable state; and
- the complement access circuit comprising a complement access transistor comprising a gate coupled to a word line, a first electrode coupled to a source line, and a second electrode coupled to the complement output node, the complement access transistor configured to:
  - couple the source line to the complement output node in response to a word line signal on the word line indicating an access enable state; and
  - decouple the source line from the complement output node in response to the word line signal on the word line indicating an access disable state.

\* \* \* \* \*